US012784610B2

(12) United States Patent
Kane et al.

(10) Patent No.: US 12,784,610 B2
(45) Date of Patent: Nov. 3, 2026

(54) SYSTEM AND METHOD FOR TRAINING A USER VIA AN EMULATED REAL-WORLD BUILDING ENVIRONMENT

(71) Applicant: Northeastern University, Boston, MA (US)

(72) Inventors: Michael Bruce Kane, Cambridge, MA (US); SungKu Kang, Boston, MA (US)

(73) Assignee: Northeastern University, Boston, MA (US)

( * ) Notice: Subject to any disclaimer, the term of this patent is extended or adjusted under 35 U.S.C. 154(b) by 286 days.

(21) Appl. No.: 18/646,540

(22) Filed: Apr. 25, 2024

(65) Prior Publication Data

US 2024/0371290 A1 Nov. 7, 2024

Related U.S. Application Data

(60) Provisional application No. 63/498,063, filed on Apr. 25, 2023.

(51) Int. Cl.
*G06F 3/01* (2006.01)
*G09B 9/00* (2006.01)

(52) U.S. Cl.
CPC *G09B 9/00* (2013.01); *G06F 3/01* (2013.01)

(58) Field of Classification Search
CPC .................................. G09B 9/00; G06F 3/01
See application file for complete search history.

(56) References Cited

PUBLICATIONS

A Building in a Box! The Future for Teaching Building Automation, available online at: <https://www.youtube.com/watch?v=JWjdA07oV34&t=1s>, retrieved on Apr. 19, 2024, 2 pages.
Alfalfa Virtual Building Service, available online at: <https://github.com/NREL/alfalfa>, retrieved on Mar. 10, 2024, 3 pages.
Alfalfa-BACnet-Bridge, available online at: <https://github.com/NREL/alfalfa-bacnet-bridge>, retrieved on Mar. 10, 2024, 3 pages.
Ashrae®, Guideline 36: Best in Class HVAC Controlsequences, Shaping Tomorrow's Built Environment Today, 2021, 5 pages.
Better Buildings®, Building Operators: Grid and Occupant Training, Case Study, 2023, 3 pages.

(Continued)

*Primary Examiner* — Robert P Bullington
(74) *Attorney, Agent, or Firm* — Hamilton, Brook, Smith & Reynolds, P.C.

(57) ABSTRACT

A computer-based system and corresponding computer-implemented method for training a user via an emulated real-world building environment are provided. Based on an initial training input from a trainer user, a building simulation model is implemented. The building simulation model is configured to produce an emulated real-world building environment. For an iteration of the building simulation model, a value of at least one forcing function is determined. The at least one forcing function is associated with the emulated real-world building environment. Based on the value of the at least one forcing function determined and at least one building operation input received from a trainee user via a building training interface, a current state of the building simulation model is transformed into an updated state of the building simulation model. Based on the updated state and the initial training input, at least one building training item is generated for the trainee user.

20 Claims, 25 Drawing Sheets

(56) References Cited

PUBLICATIONS

Building Controls Virtual Test Bed, BCVTB, available onlne at: <https://simulationresearch.lbl.gov/bcvtb/FrontPage>, retrieved on Apr. 29, 2024, 3 pages.

Buildings, "Department of Energy Announces up to $47.7 Million for Flexible BuildingTechnologies, Heating, Ventilation and Air Conditioning (HVAC), and solid-State Lighting", Energy Efficiency & Renewable Energy, available online at: <https://www.energy.gov/eere/buildings/articles/department-energy-announces-477-million-flexible-building-technologies>, Feb. 20, 2020, 8 pages.

EnergyPlus, available online at: <https://energyplus.net/>, retrieved on Mar. 10, 2024, 1 page.

Honeywell, "Honeywell Introduces AR/VR Simulator to Train The Industrial Workforce and Help Close SkillsGap", Honeywell Introduces AR/VR Simulator to Train The Industrial Workforce and Help Close Skills Gap, available online at: <https://www.honeywell.com/us/en/press/2018/02/honeywell-introduces-arvr-simulator-to-train-the-industrial-workforce-and-help-close-skills-gap>, Feb. 11, 2018, 2 pages.

IConnect Training®, What are the Major Components & Features of the PT-181 DDC Trainer?, available online at: <https://iconnecttraining.com/what-are-the-major-components-features-of-the-pt-181-ddc-trainer/>, retrieved on Apr. 19, 2024, 5 pages.

IConnect®, PT-181 DDC Portable Training Unit, Specifically Designed for the Direct Digital Controls (DDC) Industry, available online at: <https://iconnecttraining.com/training-units/pt-181-ddc-portable-training-unit/>, retrieved on Mar. 10, 2024, 5 pages.

Melanie L. Danuser, BOC 2022 Updates, 2022, 4 pages.

Michael Kane, "A Scalable Hardware-and-Human-in-the-Loop (HwHuIL) GEB Building Equipment Performance Dataset," 2023, 22 pages.

Michael Kane, "Training the Coming Generation of Grid-Interactive Efficient Building Operators", Northeastern University College of Engineering, Mar. 8, 2023, 3 pages.

Schneider Electric, EcoStruxure(TM) Building, available online at: <https://www.se.com/us/en/work/campaign/innovation/buildings.jsp>, retrieved on Apr. 29, 2024, 8 pages.

Sparn, B., et al., "Hardware-in-the-Loop (HIL) Simulations for Smart Grid Impact Studies", 2018 IEEE Power & Energy Society General Meeting (PESGM), Aug. 2018, 7 pages.

The Building Controls Virtual Test Bed (BCVTB), available online at: <https://github.com/lbl-srg/bcvtb>, retrieved on Jun. 21, 2024, 3 pages.

Tridium, Niagara Supervisor for Server-Level Control, Open Automation Solutions, available online at: <https://www.tridium.com/us/en/Products/niagara/supervisor>, retrieved on Mar. 10, 2024, 4 pages.

Trnsys, Transient System Simulation Tool, available online at: <https://www.trnsys.com>, retrieved on Apr. 29, 2024, 2 pages.

800C

SYSTEM AND METHOD FOR TRAINING A USER VIA AN EMULATED REAL-WORLD BUILDING ENVIRONMENT

RELATED APPLICATION

This application claims the benefit of U.S. Provisional Application No. 63/498,063, filed on Apr. 25, 2023. The entire teachings of the above application are incorporated herein by reference.

GOVERNMENT SUPPORT

This invention was made with government support under Grant No. DE-EE0009742 from the Department of Energy. The government has certain rights in the invention.

BACKGROUND

The use of building systems, e.g., building automation systems (BAS) and heating, ventilation, and air conditioning (HVAC) systems, has increased over time. However, current approaches for training building operators remain inadequate.

SUMMARY

A building operator is a person who manages and maintains, e.g., building automation systems (BAS) and heating, ventilation, and air conditioning (HVAC) systems, in buildings. Buildings are becoming increasingly energy efficient, and thus building operators may be well positioned to impact, e.g., facility energy consumption, operational costs, grid-interactivity, and occupant complaints about discomfort. Among other things, embodiments disclosed herein provide "Building Operator: Grid-Occupant" (BOGO) training modules to expand training of building operators (e.g., entry-level operators) to include not just energy efficiency and peak demand reductions, but also energy flexibility. Such grid-interactive efficient buildings (GEBs) can shed, shift, and modulate their loads to provide added value to the grid at a levelized cost of energy (LCOE) less than traditional and renewable sources, a potentially $15B/year market opportunity. Achieving these benefits may require advanced controls, the operation of which is often outsourced to contractors working with building operators, yet many building operators may struggle to work together effectively and share responsibilities. A training program is thus needed for operators of, e.g., mid- and large-sized buildings, to improve their GEB literacy, which training program may also include content on, e.g., maintaining indoor environmental quality (IEQ)/indoor air quality (IAQ) expectations of occupants, such as through occupant-centric control (OCC), to increase occupant satisfaction with GEB initiatives. Embodiments address these and other building operator training needs unmet by existing systems.

Among other things, embodiments provide a new educational tool that allows building operators to learn through simulation-based training. Current building operator curriculums assume trainees are already working in the field and can learn-by-doing in their own buildings. An example embodiment provides a standardized prototype building model, which may leverage EnergyPlus® or other suitable known tool, that is co-simulated in real-time (or faster than real-time) with a BAS demonstrator, which may be a hardware-based demonstrator, for non-limiting example. This allows students to simulate real-life building scenarios and learn how to, e.g., modify schedules and setpoints to meet energy management objectives. Embodiments deliver novel solutions to the problems of limited access to skilled mentors, limited types of training scenarios, and risks associated with training on real, physical buildings, for non-limiting examples.

According to an example embodiment, a computer-based system for training a user via an emulated real-world building environment comprises a building training interface, at least one processor, and a memory with computer code instructions stored thereon. The building training interface corresponds to a trainee user. The at least one processor and the memory, with the computer code instructions, are configured to cause the system to, based on an initial training input from a trainer user, implement a building simulation model. The building simulation model is configured to produce an emulated real-world building environment. The at least one processor and the memory, with the computer code instructions, are further configured to cause the system to, for an iteration of the building simulation model, determine a value of at least one forcing function. The at least one forcing function is associated with the emulated real-world building environment. The at least one processor and the memory, with the computer code instructions, are further configured to cause the system to, based on (i) the value of the at least one forcing function determined and (ii) at least one building operation input received from the trainee user via the building training interface, transform a current state of the building simulation model into an updated state of the building simulation model. The at least one processor and the memory, with the computer code instructions, are further configured to cause the system to, based on (i) the updated state and (ii) the initial training input, generate at least one building training item for the trainee user.

In an example embodiment, the building training interface may be a first building training interface. The building simulation model may be a first building simulation model. The trainee user may be a first trainee user. In this example embodiment, the system may further comprise a second building training interface corresponding to a second trainee user. The at least one processor and the memory, with the computer code instructions, may be further configured to cause the system to, based on the initial training input from the trainer user, implement a second building simulation model. The second building simulation model may be configured to produce the emulated real-world building environment. The at least one processor and the memory, with the computer code instructions, may be further configured to cause the system to, for the iteration, based on (i) the value of the at least one forcing function determined and (ii) at least one building operation input received from the second trainee user via the second building training interface, transform a current state of the second building simulation model into an updated state of the second building simulation model. The at least one processor and the memory, with the computer code instructions, may be further configured to cause the system to, based on (i) the updated state of the first building simulation model, (ii) the updated state of the second building simulation model, and (iii) the initial training input, generate the at least one building training item for the first trainee user. In this example embodiment, the at least one building training item may include a comparison of building operation performance of the first trainee user and building operation performance of the second trainee user.

According to an example embodiment, the at least one processor and the memory, with the computer code instructions, may be further configured to cause the system to iteratively determine the value of the at least one forcing function and the transform the current state of the building simulation model into the updated state of the building simulation model on an ongoing basis while the trainee user is interacting with the building training interface, during times when the trainee user is not interacting with the building training interface, or based on input from the trainer user. In another example embodiment, the at least one processor and the memory, with the computer code instructions, may be further configured to cause the system to iteratively determine the value of the at least one forcing function and transform the current state of the building simulation model into the updated state of the building simulation model in real-time or faster-than-real-time. In yet another example embodiment, the at least one processor and the memory, with the computer code instructions, may be further configured to cause the system to iteratively determine the value of the at least one forcing function and transform the current state of the building simulation model into the updated state of the building simulation model in at least one of: a periodic mode, an event driven mode, and a mode defined by the trainer user.

In an example embodiment, a forcing function of the at least one forcing function may relate to at least one of: (i) weather conditions, (ii) electricity costs, (iii) energy costs, and (iv) occupant behavior.

According to an example embodiment, the at least one processor and the memory, with the computer code instructions, may be further configured to cause the system to, based on subsequent training input from the trainer user, configure at least one parameter of (i) the building simulation model or (ii) a forcing function of the at least one forcing function. In another example embodiment, the subsequent training input may represent at least one of a simulated malfunction of the real-world building environment and a simulated weather event for the real-world building environment.

In an example embodiment, the initial training input may include at least one criterion for a building operation certification. The at least one processor and the memory, with the computer code instructions, may be further configured to cause the system to perform a determination of whether the updated state of the building simulation model satisfies the at least one criterion. In this example embodiment, the at least one processor and the memory, with the computer code instructions, may be further configured to cause the system to, responsive to the determination performed indicating that the updated state of the building simulation model satisfies the at least one criterion, generate the at least one building training item. The at least one building training item may include an indication that the trainee user has achieved the building operation certification. According to another example embodiment, a criterion of the at least one criterion may relate to an energy optimization objective or an occupant satisfaction objective.

According to an example embodiment, the at least one processor and the memory, with the computer code instructions, may be further configured to cause the system to generate a visual comparison of (i) one or more states of the building simulation model and (ii) one or more states of a baseline model. A building training item of the at least one building training item generated may include the visual comparison generated. In another example embodiment, the one or more states of the baseline model may represent (i) states of the emulated real-world building environment simulated by the trainer user or (ii) historical states of the real-world building environment.

In another example embodiment, a computer-implemented method for training a user via an emulated real-world building environment comprises, based on an initial training input from a trainer user, implementing a building simulation model. The building simulation model is configured to produce an emulated real-world building environment. The method further comprises, for an iteration of the building simulation model, determining a value of at least one forcing function. The at least one forcing function is associated with the emulated real-world building environment. The method further comprises, based on (i) the value of the at least one forcing function determined and (ii) at least one building operation input received from a trainee user via a building training interface, transforming a current state of the building simulation model into an updated state of the building simulation model. The method further comprises, based on (i) the updated state and (ii) the initial training input, generating at least one building training item for the trainee user.

Alternative computer-implemented method embodiments parallel those described above in connection with the example computer-based system embodiment.

According to yet another example embodiment, a non-transitory computer-readable medium has encoded thereon a sequence of instructions which, when loaded and executed by at least one processor, causes the at least one processor to, based on an initial training input from a trainer user, implement a building simulation model. The building simulation model is configured to produce an emulated real-world building environment. The sequence of instructions further causes the at least one processor to, for an iteration of the building simulation model, determine a value of at least one forcing function. The at least one forcing function is associated with the emulated real-world building environment. The sequence of instructions further causes the at least one processor to, based on (i) the value of the at least one forcing function determined and (ii) at least one building operation input received from a trainee user via a building training interface, transform a current state of the building simulation model into an updated state of the building simulation model. The sequence of instructions further causes the at least one processor to, based on (i) the updated state and (ii) the initial training input, generate at least one building training item for the trainee user.

Alternative non-transitory computer-readable medium embodiments parallel those described above in connection with the example computer-based system embodiment.

It is noted that example embodiments of a system, method, and computer-readable medium may be configured to implement any embodiments, or combination of embodiments, described herein.

It should be understood that example embodiments disclosed herein can be implemented in the form of a system, method, apparatus, or computer-readable medium with program codes embodied thereon.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

Figure 1:
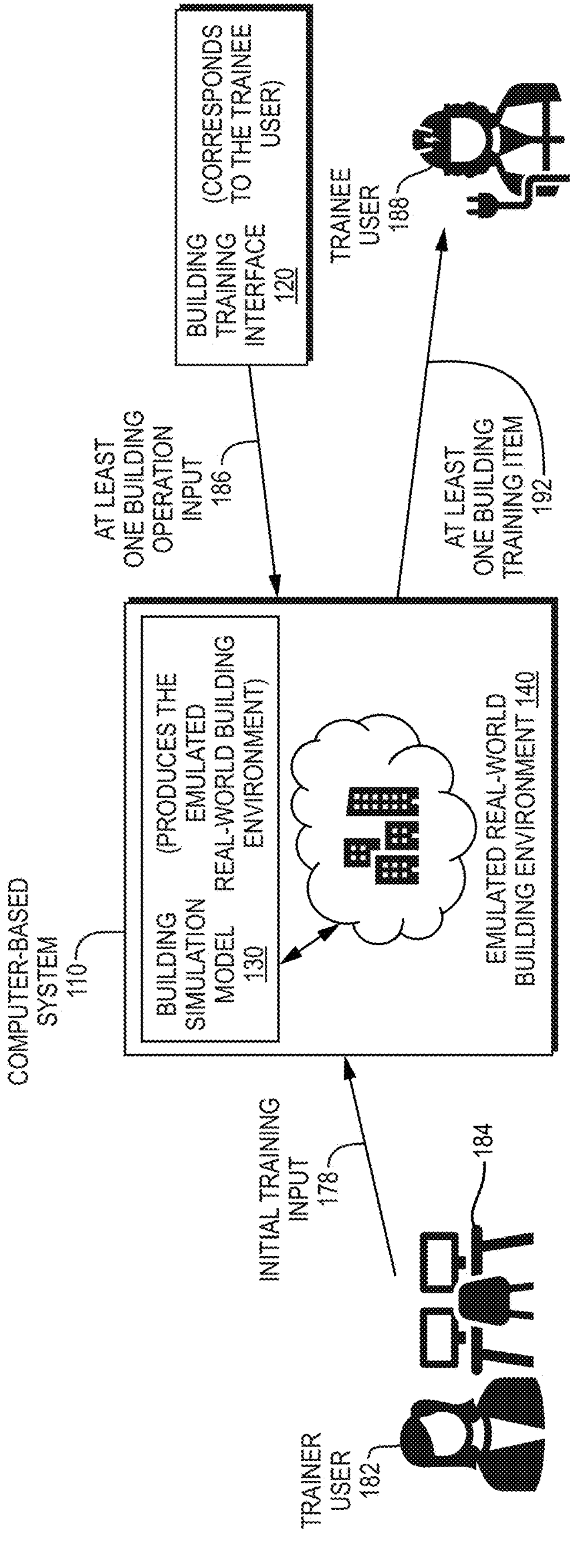
FIG. 1 is a block diagram of a computer-based system that includes an example embodiment of the present disclosure.

A description of example embodiments follows.

Buildings interact with a grid in complex ways that vary over, e.g., time and space, weather, occupants, and hidden conditions in the grid. It is not expected that building operators are experts in all these areas, yet they should be able to effectively communicate and coordinate with such experts. Trainees often rotate through various hands-on demonstrators such as refrigerant loops, wiring, and steam fitting, which are important for learning tactile skills and understanding system interactions. However, no such demonstrator trains users on interactions between systems in a building, e.g., building automation systems (BAS) and heating, ventilation, and air conditioning (HVAC) systems, building physics, the environment, and occupants, for non-limiting examples. Among other things, example embodiments of the present disclosure provide such a first-of-its-kind hands-on building operation demonstrator, which leverages pure simulation-based approaches such as Alfalfa, for non-limiting example.

According to an example embodiment, a hands-on whole-building operation demonstrator may be a valuable instructional tool to achieve learning objectives described herein, because no current building operator curriculum leverages the benefits of simulation-based learning. The building operation demonstrator may leverage techniques for real-time co-simulation. An example embodiment may provide a standardized prototype building model, which may leverage EnergyPlus® or other suitable known tool in, e.g., a Building Controls Virtual Testbed (BCVTB), that is co-simulated in real-time (or faster than real-time) with a BAS demonstrator, which may be a hardware-based demonstrator. In another example embodiment, a building operation demonstrator may provide a user interface (UI) and user experience (UX) with a design that evokes real BAS interfaces, yet is simplified to be approachable by a novice. Further, in yet another example embodiment, a building operation demonstrator may provide online connectivity for remote learning.

In an example embodiment, a building operation demonstrator may simulate for a student the first days on a job supervised by an excellent mentor who provides clear tasks in controlled environments that provide opportunities for learning. The building operation demonstrator may provide these learning opportunities without risk to building owners and without need of such a real-life, skilled mentor, which may be difficult to come by in an aging workforce with rapidly changing technologies. For instance, the building operation demonstrator may provide a real BAS interface where a trainee user can modify schedules and setpoints to meet needs of occupants in a case study, and explore how, e.g., precooling, conservation setpoints, and occupant overrides, may play a role in achieving energy management objectives like efficiency and peak reduction.

Example embodiments disclosed herein may integrate, e.g., an EnergyPlus® BCVTB with a hands-on BAS simulator into a real-time BAS hardware-in-the-loop (HwIL) simulator. Example embodiments disclosed herein may provide an interface for a building operation simulator that closely resembles interfaces seen by real-life building operators. Optionally, example embodiments disclosed herein may provide virtualization of hands-on components for institutions, such as educational institutions, that cannot afford a commercial hardware BAS simulator or where a curriculum is to be taught online. Example embodiments disclosed herein may specify prototype buildings, a simplified interface, and case studies that integrate into a BOGO curriculum.

According to an example embodiment, demand for BOGO training modules from, e.g., utilities, building owners, and state programs, may catalyze adoption of a new Building Operator Certification (BOC) Fundamentals program targeted at vocation technical (VoTech) high schools and community colleges (CCs) with integrated internship programs. This workforce development may be timely because, for instance, a current workforce of 45,000 plus in Massachusetts alone is growing 10% per year faster than the national labor market, yet employers may list lack of qualifications and ability to adapt to changing technologies as two of their greatest challenges. The learning modules may combine classroom and e-learning with a first-of-a-kind hands-on whole-building demonstrator. The simulation-based case-studies may not only teach fundamentals of BAS components, but also show how a whole building acts as a system and introduce an array of contractors that a building operator may need to effectively communicate with to operate and maintain a building.

In an example embodiment, a BOGO curriculum may provide soon-to-become building operators with literacy in the fundamentals of how buildings interact with a grid and how such interactions may affect occupants. Three exemplary curriculum modules may amount to, e.g., 14 hours, of classroom time to cover the following exemplary learning objectives:

a) GEB-1: Explain how regular building operations decisions affect a building's energy and power consumption.
b) GEB-2: Identify availability and benefits of commercial building grid-interactive building programs such as time-of-use pricing, demand response, etc.
c) OCC-1: Identify properties of a building, an HVAC system, and an electric grid that can limit an operator's ability to provide occupant thermal comfort.
d) OCC-2: Understand how occupant behaviors can impact a built environment and building energy performance: from occupant, to building, to grid scales.
c) BOGO-1: Explain how a good relationship between building operators and occupants can help make buildings more efficient and effective GEBs.
f) BOGO-2: Understand potential strategies for using tenant engagement, communication, and education efforts to enhance occupant behaviors, comfort, and building energy use.

Example embodiments disclosed herein may catalyze a pipeline of building operators prepared with competencies and passion necessary to operate a current and next generation of grid-interactive efficient buildings.

FIG. 1 is a block diagram of a computer-based system 110 that includes an example embodiment of the present disclosure. In the example embodiment of FIG. 1, the system 110 comprises a building training interface 120, at least one processor (not shown), and memory (not shown) with computer code instructions (not shown) stored thereon, such as disclosed further below with respect to FIG. 20. The building training interface 120 corresponds to a trainee user 188. The at least one processor and the memory, with the computer code instructions, are configured to cause the system 110 to, based on an initial training input 178 from a trainer user 182, implement a building simulation model 130, which may utilize, e.g., an EnergyPlus® tool. The trainer user 182 may employ or alternatively may be a user device 184 such as a personal computer (PC), laptop, table, smartphone, or any other suitable known user device. The user device 184 may also be configured to execute the system 110. Continuing with reference to FIG. 1, the building simulation model 130 is configured to produce an emulated real-world building environment 140. The at least one processor and the memory, with the computer code instructions, are further configured to cause the system 110 to, for an iteration of the building simulation model 130, determine a value of at least one forcing function (not shown). The at least one forcing function is associated with the emulated real-world building environment 140. The at least one processor and the memory, with the computer code instructions, are further configured to cause the system 110 to, based on (i) the value of the at least one forcing function determined and (ii) at least one building operation input 186 received from the trainee user 188 via the building training interface 120, transform a current state (not shown) of the building simulation model 130 into an updated state (not shown) of the building simulation model 130. The at least one processor and the memory, with the computer code instructions, are further configured to cause the system 110 to, based on (i) the updated state and (ii) the initial training input, generate at least one building training item 192 for the trainee user 188.

Figure 2:
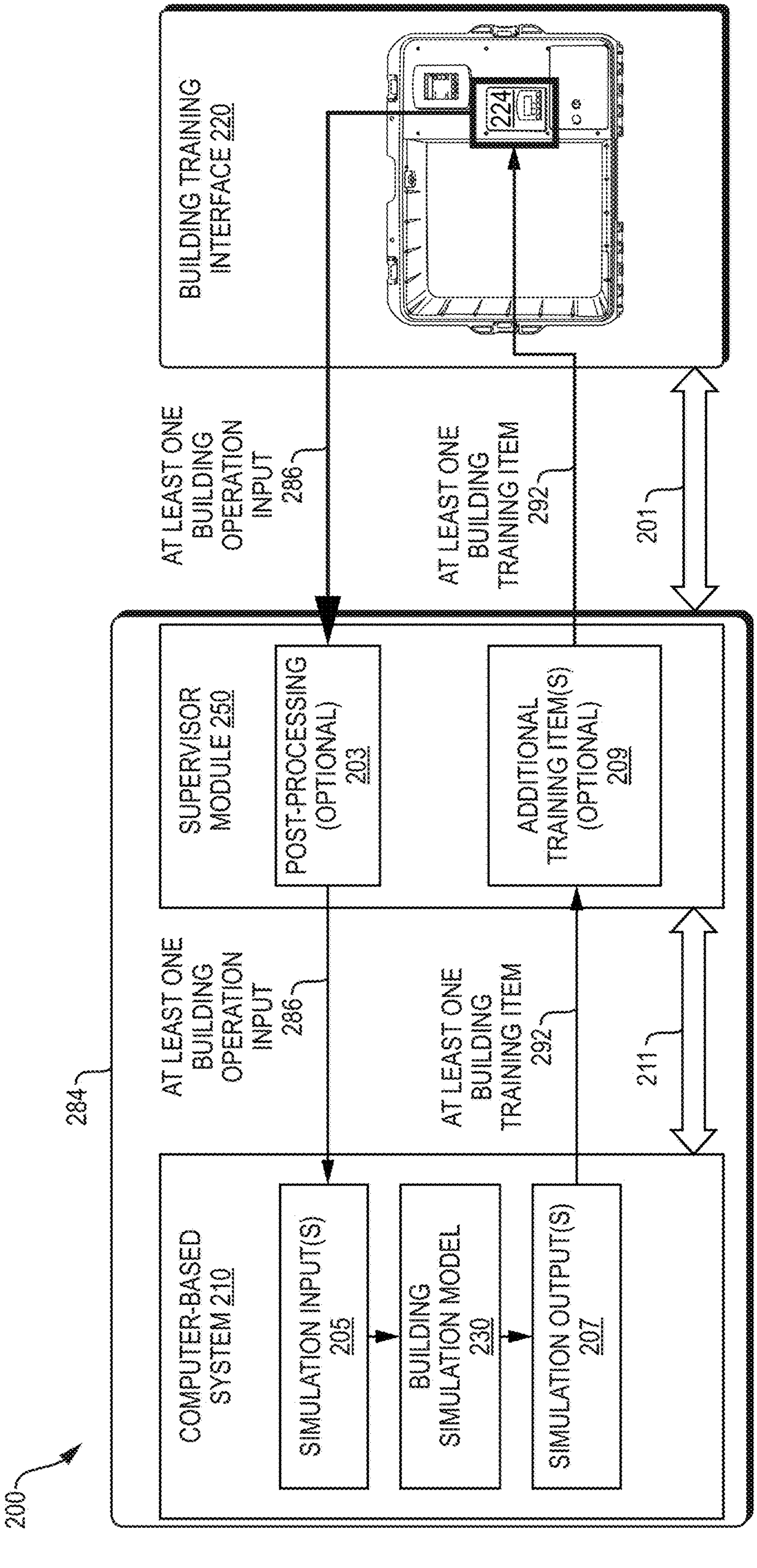
FIG. 2 is a block diagram of an example embodiment of an architecture for training a user via an emulated real-world building environment.

FIG. 2 is a block diagram of an example embodiment of an architecture 200 for training a user via an emulated real-world building environment. In the example embodiment of FIG. 2, the architecture 200 includes a computer-based system 210, a building training interface 220, a building simulation model 230, and a supervisor module 250. The building training interface 220 may be, e.g., an iConnect® Training PT-181 BAS portable training unit provided by North Park Innovations Group, Inc. (Ellicottville, NY) or other suitable known building training interface. In addition, the building training interface 220 may serve as a hands-on component of a whole-building operation demonstrator for a trainee user (not shown). The building training interface 220 may also include a thermostat 224, which may be, e.g., a smart thermostat or other suitable known thermostat. The system 210 may execute on user device 284, which may be, e.g., a PC, laptop, table, smartphone, or any other suitable known user device. Alternatively, the system 210 may execute on a cloud server (not shown). In addition, the system 210 may employ a web service such as Alfalfa or other suitable known web service. The supervisor 250 may be, e.g., a component provided as part of the Niagara Framework® or other suitable known framework.

In an example embodiment, the system 210 may be configured to, based on an initial training input (not shown) from a trainer user (not shown), implement the building simulation model 230. The trainer user may employ or alternatively may be the user device 284. To continue, the building simulation model 230 may be configured to produce an emulated real-world building environment (not shown). The system 210 may be further configured to, for an iteration of the building simulation model 230, determine a value of at least one forcing function (not shown). The at least one forcing function may be associated with the emulated real-world building environment.

According to an example embodiment, at least one building operation input 286 may be entered by the trainee user via the thermostat 224 of the building training interface 220 and may include, e.g., cooling/heating setpoint(s) and/or deadband information, for non-limiting examples. In another example embodiment, the at least one building operation input 286 may be imported from the building training interface 220 via, e.g., BACnet® or other suitable known communication protocol such as a protocol used for building automation and control (BAC) networks. Further, in yet another example embodiment, the imported at least one building operation input 286 may be transmitted to the supervisor 250 via network 201, which may be, e.g., a network provided as part of the Niagara Framework® or other suitable known network.

In an example embodiment, the supervisor 250 may optionally apply post processing 203 to the at least one building operation input 286. The optional processing 203 may include, e.g., unit conversion such as Fahrenheit to Celsius conversion.

Further, in yet another example embodiment, the system 210 may receive the at least one building operation input 286 (optionally with processing 203 applied) from the supervisor 250. The at least one building operation input 286 may also include other data provided by the supervisor 250, such as how much time to advance the building simulation model 230. The at least one building operation input 286 may be received by the system 210 from the supervisor 250 via network 211, which may be, e.g., a network employing BACnet® or other suitable known communication protocol such as a protocol used for BAC networks. According to an example embodiment, the system 210 may interface with the network 211 by utilizing a BACnet® adapter for Alfalfa, e.g., the Alfalfa BACnet® Bridge or other suitable known tool.

Continuing with reference to FIG. 2, the system 210 may be further configured to, based on (i) the value of the at least one forcing function determined and (ii) the at least one building operation input 286, transform a current state (not shown) of the building simulation model 230 into an updated state (not shown) of the building simulation model 230. In an example embodiment, transforming the current state of the building simulation model 230 may include generating updated simulation input(s) 205 for the building simulation model 230. According to another example embodiment, producing the updated state of the building simulation model 230 may include generating simulation output(s) 207.

Continuing with reference to FIG. 2, the system 210 may be further configured to, based on (i) the updated state and (ii) the initial training input, generate at least one building training item 292 for the trainee user. In an example embodiment, the at least one building training item 292 may include one or more of the following exemplary training item(s) relating to the emulated real-world building environment: indoor temperature, indoor humidity, energy usage, and/or outdoor temperature.

In an example embodiment, after receiving the at least one building training item 292 from the system 210 via the network 211, the supervisor 250 may optionally include exemplary training item(s) 209 relating to the emulated real-world building environment such as a visualization of indoor environment history and/or analysis(es) of energy usage and/or occupant comfort, in the at least one building training item 292.

According to another example embodiment, the at least one building training item 292 (optionally including the exemplary training item(s) 209) may be provided to the building training interface 220 (i.e., corresponding to the trainee user) by the supervisor 250 via the network 201. Further, in yet another example embodiment, providing the at least one building training item 292 to the building training interface 220 may include updating the thermostat 224 to show a virtual indoor environment of the emulated real-world building environment.

Figure 3A:
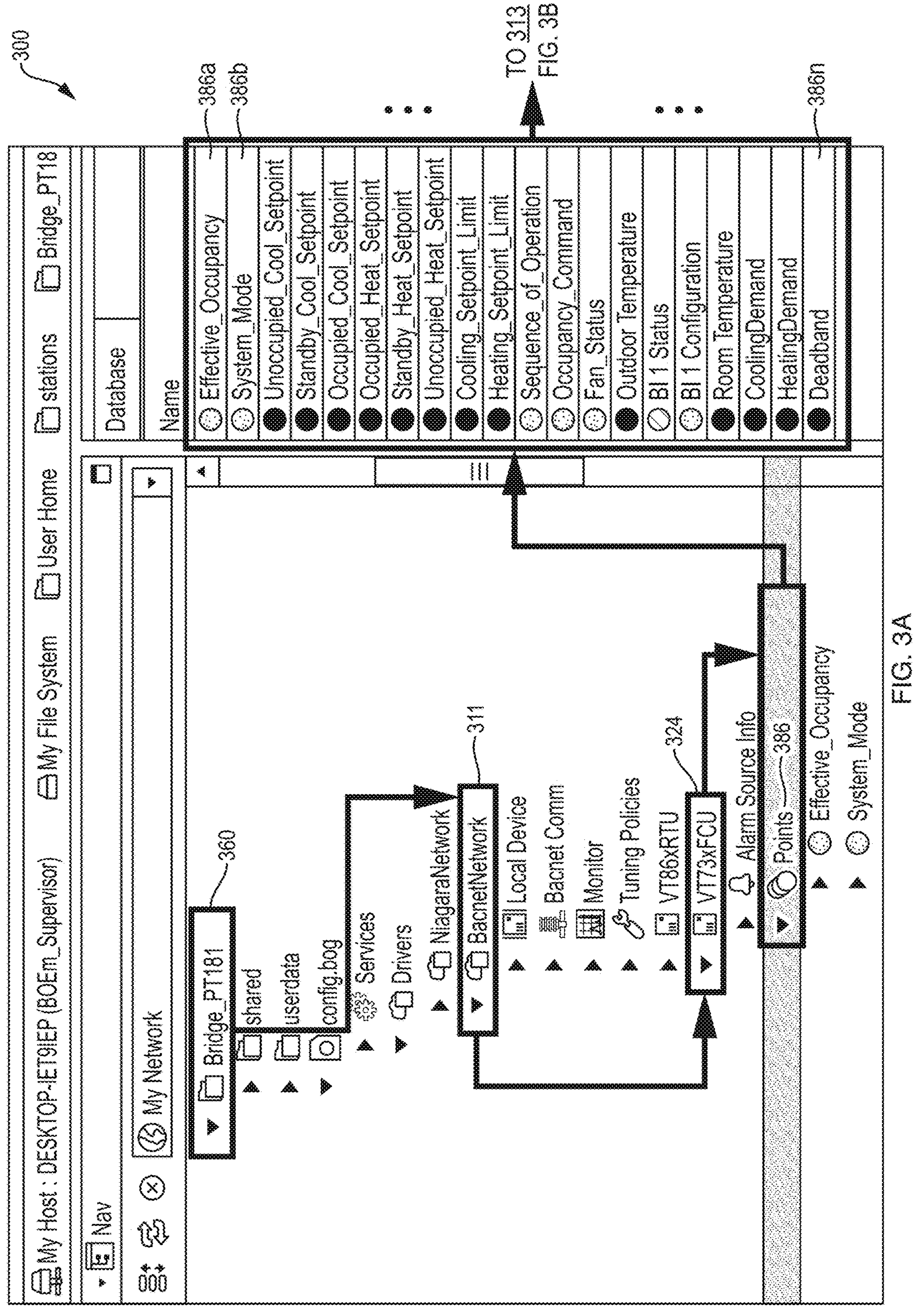
FIGS. 3A-3B are block diagrams of an example embodiment of an implementation of reading at least one building operation input from a thermostat.
Figure 3B:
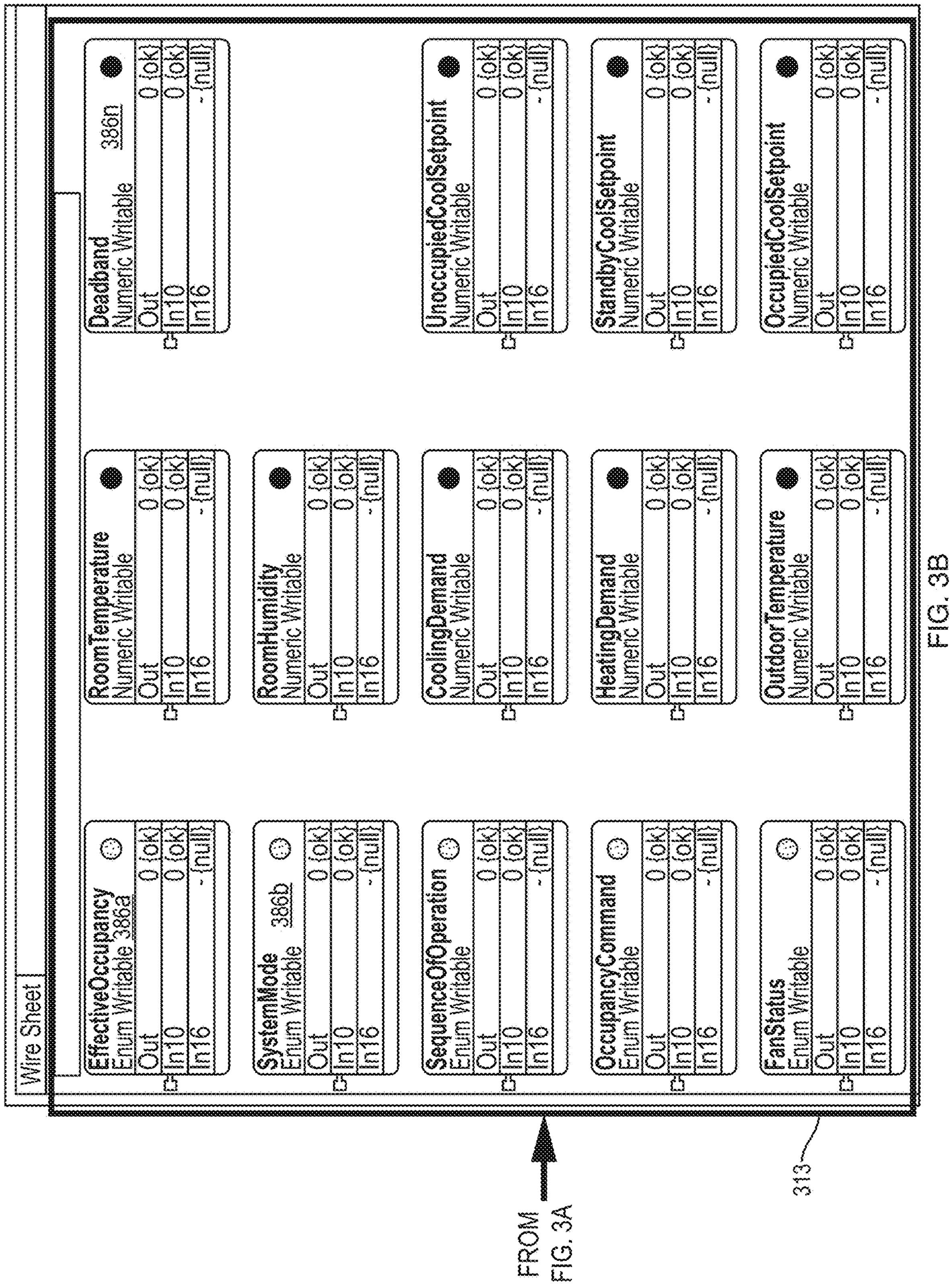

FIGS. 3A-3B are block diagrams of an example embodiment of an implementation 300 of reading at least one building operation input **386*a*-386*n* from a thermostat 324. In the example embodiment of FIGS. 3A-3B, a station module 360 may be deployed to a building training interface, e.g., building training interface 220 (FIG. 2) or 720 (FIG. 7), which may include the thermostat 324. The station 360 may be, e.g., a component provided as part of the Niagara Framework® or other suitable known framework. The thermostat 324 may be, e.g., a smart thermostat or other suitable known thermostat. The station 360 may read or import the at least one building operation input 386*a*-386*n* from the thermostat 324 via network 311, which may be, e.g., a network employing BACnet® or other suitable known communication protocol such as a protocol used for BAC networks. The at least one building operation input 386*a*-386*n* may include, e.g., effective occupancy information 386*a*, system mode information 386*b*, and/or deadband information 386*n*. After reading the at least one building operation input 386*a*-386*n*, the station 360 may store or save the imported at least one building operation input 386*a*-386*n* as stored data 313. The stored data 313 including the at least one building operation input 386*a*-386*n* may in turn be forwarded to or accessed by a supervisor module, e.g., supervisor 250 (FIG. 2) or 450 (FIG. 4A), such as via a network, e.g., network 201 (FIG. 2) or 401 (FIG. 4**A).

Figure 4A:
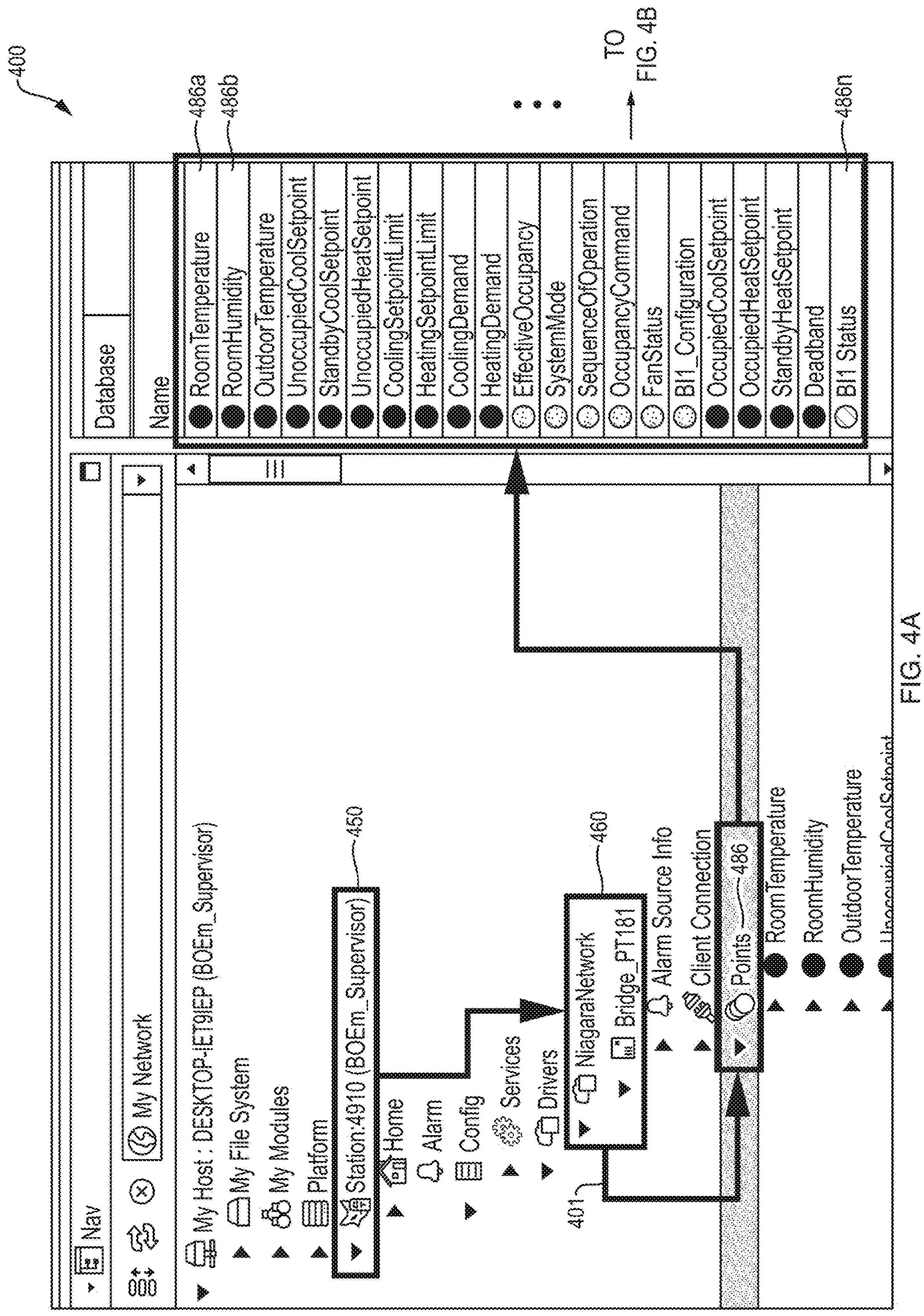
FIGS. 4A-4B are block diagrams of an example embodiment of an implementation of importing at least one building operation input from a thermostat.
Figure 4B:
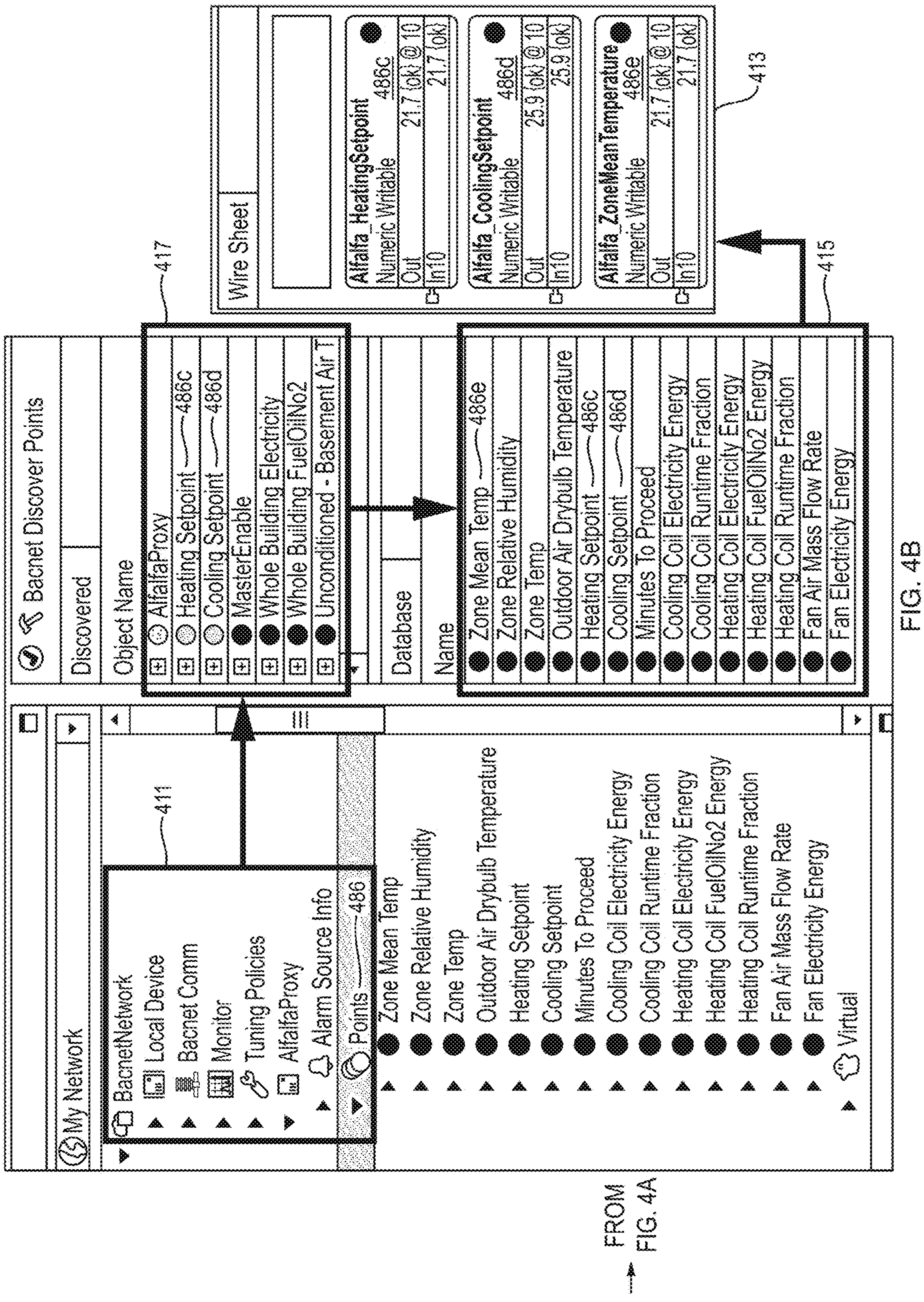
Figure 7:
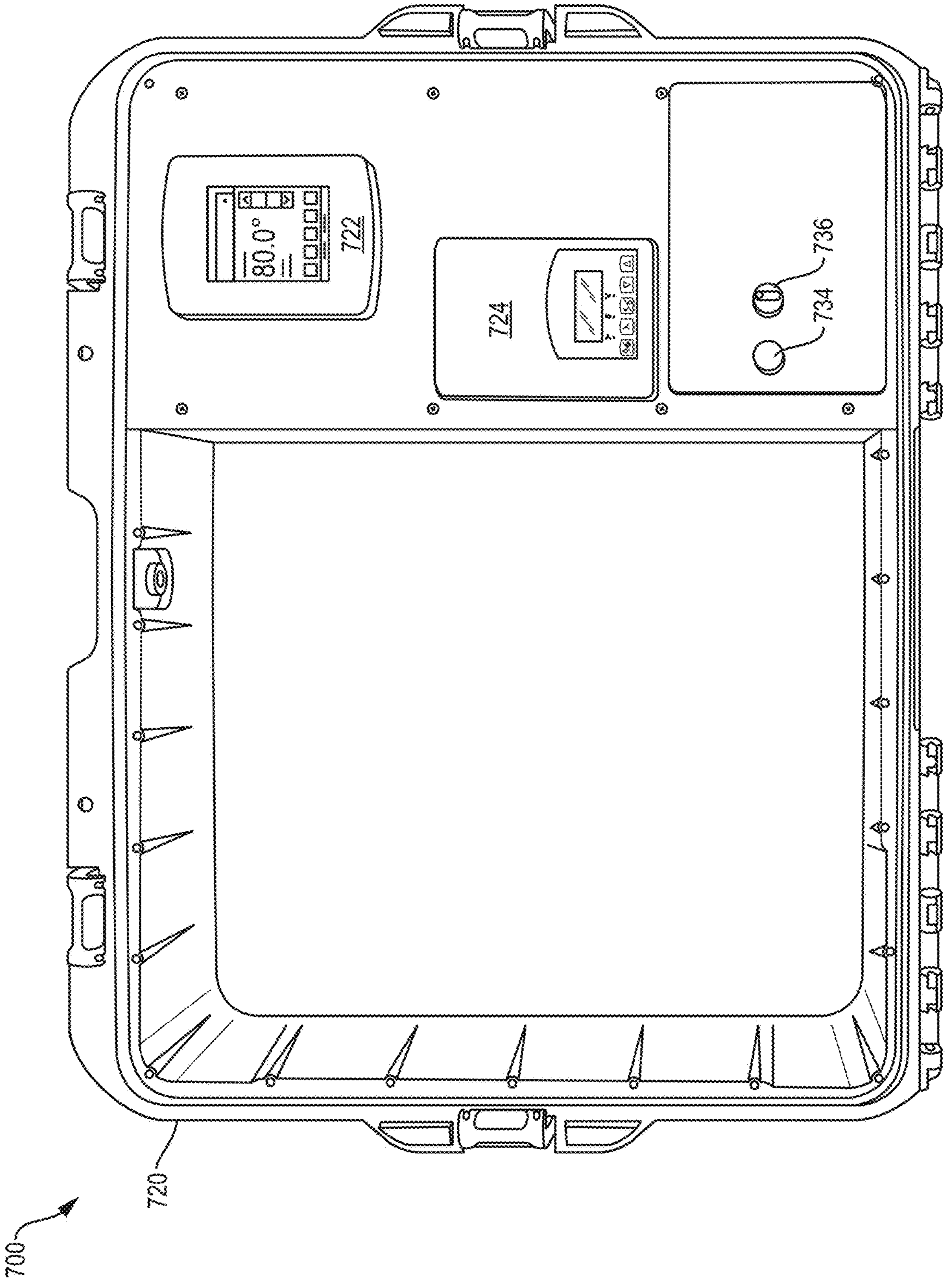
FIG. 7 is an image of a building automation system (BAS) training interface according to an example embodiment.

FIGS. 4A-4B are block diagrams of an example embodiment of an implementation 400 of importing at least one building operation input **486*a*-486*n* from a thermostat, e.g., thermostat 224 (FIG. 2), 324 (FIG. 3A), or 724 (FIG. 7). In the example embodiment of FIGS. 4A-4B, a station module 460 may be deployed to a building training interface, e.g., the building training interface 220 (FIG. 2) or 720 (FIG. 7), which may include the thermostat. The station 460 may be, e.g., a component provided as part of the Niagara Framework® or other suitable known framework. A supervisor module 450 may import the at least one building operation input 486*a*-486*n* from the station 460 such as through network 401, which may be, e.g., a network provided as part of the Niagara Framework® or other suitable known network. The supervisor 450 may be, e.g., a component provided as part of the Niagara Framework® or other suitable known framework. To continue, the supervisor 450 may also establish communication with a computer-based system, e.g., system 110 (FIG. 1) or 210 (FIG. 2), such as through network 411, which may be, e.g., a network employing BACnet® or other suitable known communication protocol such as a protocol used for BAC networks. In addition, the supervisor 450 may store simulation data 413 including the at least one building operation input 486*c*, 486*d*, and 486*e*, which, as shown in FIGS. 4**A-4B, may correspond to, e.g., a heating setpoint, a cooling setpoint, and a zone mean temperature, respectively.

Continuing with reference to FIGS. 4A-4B, according to an example embodiment, the at least one building operation input **486*c*-486*e* may be retrieved from a database 415 of variables. In another example embodiment, the at least one building operation input 486*c*-486*d* may be imported into the database 415 from a collection 417** of "discovered" datapoints.

Figure 5:
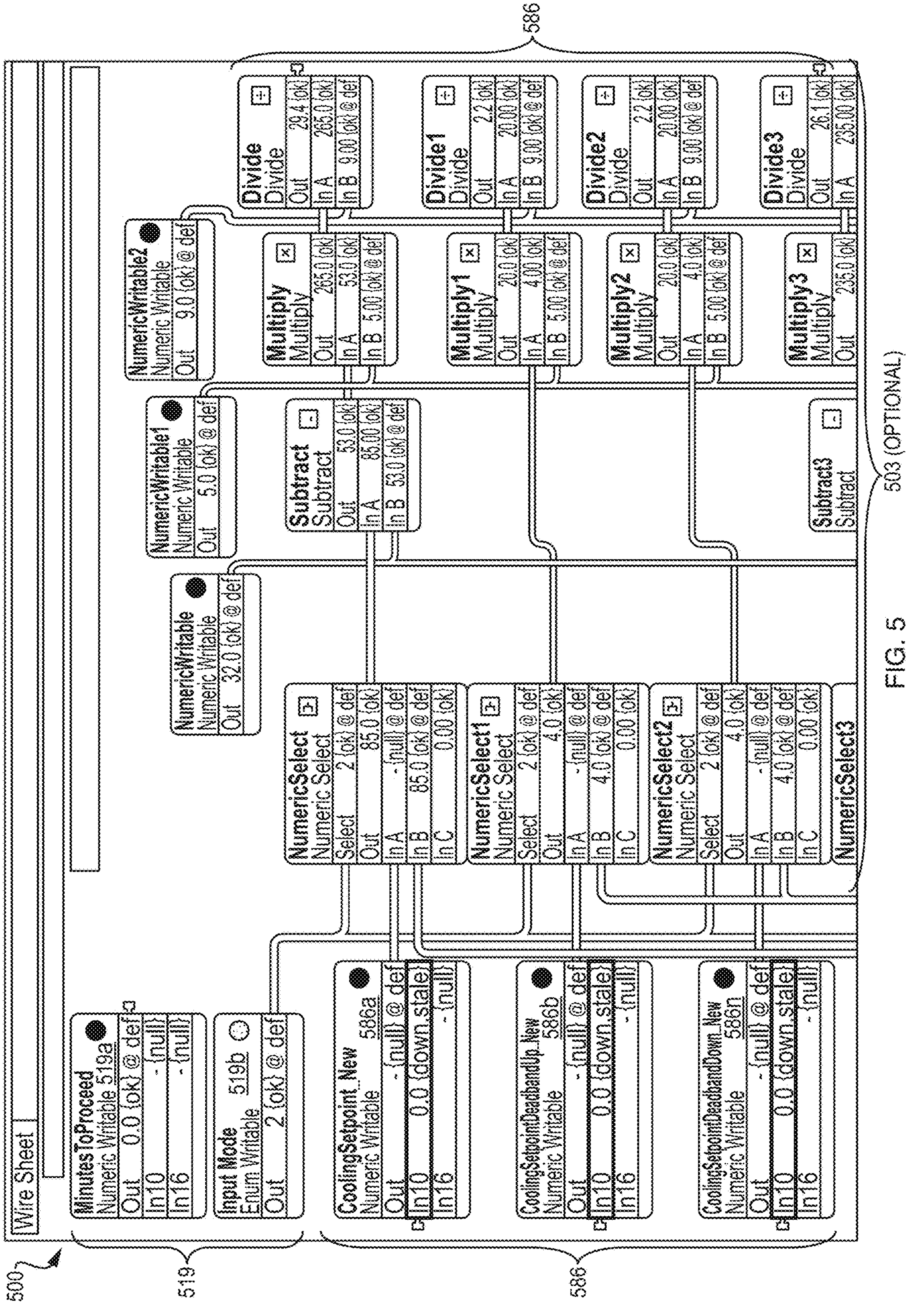
FIG. 5 is a block diagram of an example embodiment of an implementation of feeding at least one building operation input from a thermostat to a computer-based system.

FIG. 5 is a block diagram of an example embodiment of an implementation 500 of feeding at least one building operation input **586*a*-586*n* from a thermostat, e.g., thermostat 224 (FIG. 2), 324 (FIG. 3A), or 724 (FIG. 7), to a computer-based system, e.g., system 110 (FIG. 1) or 210 (FIG. 2). In the example embodiment of FIG. 5, the at least one building operation input 586*a*, 586*b*, and 586*n* may correspond to, e.g., a cooling setpoint, a cooling setpoint deadband upper range, and a cooling setpoint deadband lower range, respectively. The at least one building operation input 586*a*-586*n* may be provided to the computer-based system by a supervisor module, e.g., supervisor 250 (FIG. 2) or 450 (FIG. 4**A).

Continuing with reference to FIG. 5, in an example embodiment, additional input variables **519*a*-519*b* may also be provided by the supervisor to the computer-based system. The additional input variables 519*a* and 519*b* may indicate, for instance, an amount of time (such as a number of minutes) for which a simulation, e.g., building simulation model 130 (FIG. 1) or 230 (FIG. 2), will be run and an input mode, respectively. According to another example embodiment, the input mode variable 519*b* may be include a value of, e.g., 1 (one) or 2 (two), which may indicate that the at least one building operation input 586*a*-586*n*** should be obtained from an actual interface component (such as a thermostat) or from other—possibly user-provided—data variable(s).

Continuing with reference to FIG. 5, in yet another example embodiment, the supervisor may optionally apply post processing 503 to the at least one building operation input 586*a*-586*n* and/or the additional input variables 519*a*-519*b*. The optional post processing 503 may include, e.g., unit conversion such as Fahrenheit to Celsius conversion.

Figure 6:
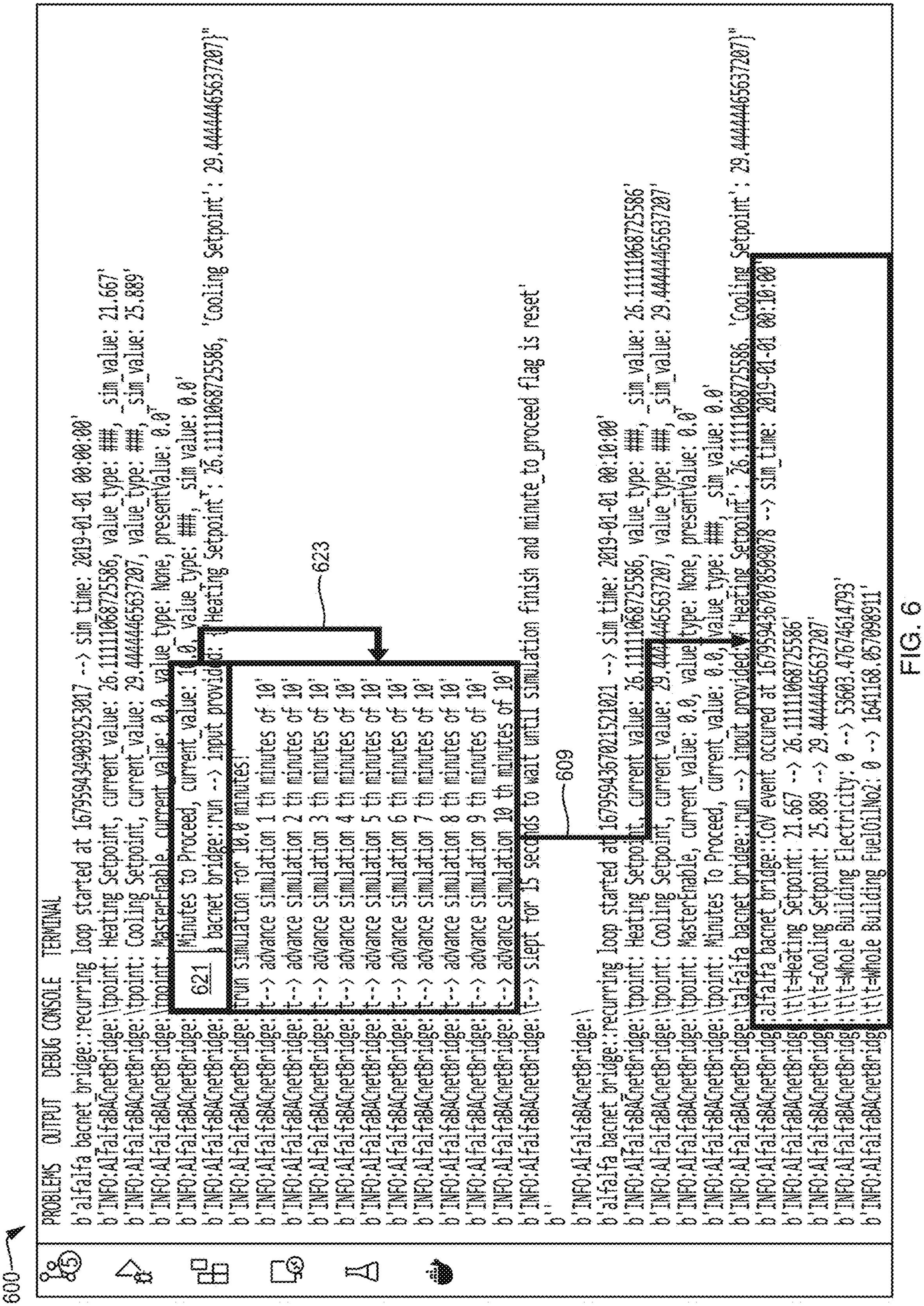
FIG. 6 is a block diagram of an example embodiment of an implementation of running a simulation.

FIG. 6 is a block diagram of an example embodiment of an implementation 600 of running a simulation, e.g., building simulation model 130 (FIG. 1) or 230 (FIG. 2), according to an example embodiment. In the example embodiment of FIG. 6, a computer-based system, e.g., system 110 (FIG. 1) or 210 (FIG. 2), may regularly check input data from a supervisor module, module, e.g., supervisor 250 (FIG. 2) or 450 (FIG. 4A). When a value of a "minutes_to_proceed" variable 621 is greater than zero, e.g., a value of 10 (ten), the computer-based system may run 623 the simulation for a given period, e.g., 10 minutes. Updated data 609 may be reported back to the supervisor.

FIG. 7 is an image 700 of a BAS training interface 720 according to an example embodiment. The BAS training interface 720 may be, e.g., an iConnect® Training PT-181 BAS portable training unit, and may serve as a hands-on component of a whole-building operation demonstrator. As shown in FIG. 7, the BAS training interface 720 may include roof top unit (RTU) controller 722, fan coil unit (FCU) thermostat 724, pushbutton switch 734, and position switch 736.

The RTU controller 722 may provide for normal I/O of, e.g., a standard heat/cool room thermostat. In addition, the RTU controller 722 may be a programmable controller that can be configured for a wide range of applications including scheduled occupancy, economizer, and/or humidity control, among other examples. The RTU controller 722 can also be reconfigured to serve as, e.g., a heat pump (HP) unit controller.

The FCU thermostat 724 may be, e.g., a "smart" room thermostat that provides for control of a FCU (not shown) equipped with a fan and one or more analog type heat/cool valves.

With existing approaches to HwIL building simulations, a component in an EnergyPlus® model may be replaced with a physical component such as a HP. Sensors may feed a state of the physical hardware into the simulation, and actuators may modify the hardware or its environment to match the simulation.

In contrast, example embodiments disclosed herein may use a HwIL approach where a BAS portable training unit, e.g., the BAS training interface 720, can serve as a physical foundation of an emulator. The BAS training interface 720 may show a real-time status of components such as dampers, thermostats (e.g., 722, 724), switches (e.g., 734, 736), and fans in a simulation (not shown). Students may manipulate the BAS training interface 720, and BAS control signals may be fed into the simulation. The simulation may run on a computer (not shown) running a BAS system (not shown) directly connected to the BAS training interface 720, or on a separate computer connected via network (not shown). At each time step of the simulation, the simulation may speak with the BAS training interface 720 using a BACnet® protocol.

Figure 8A:
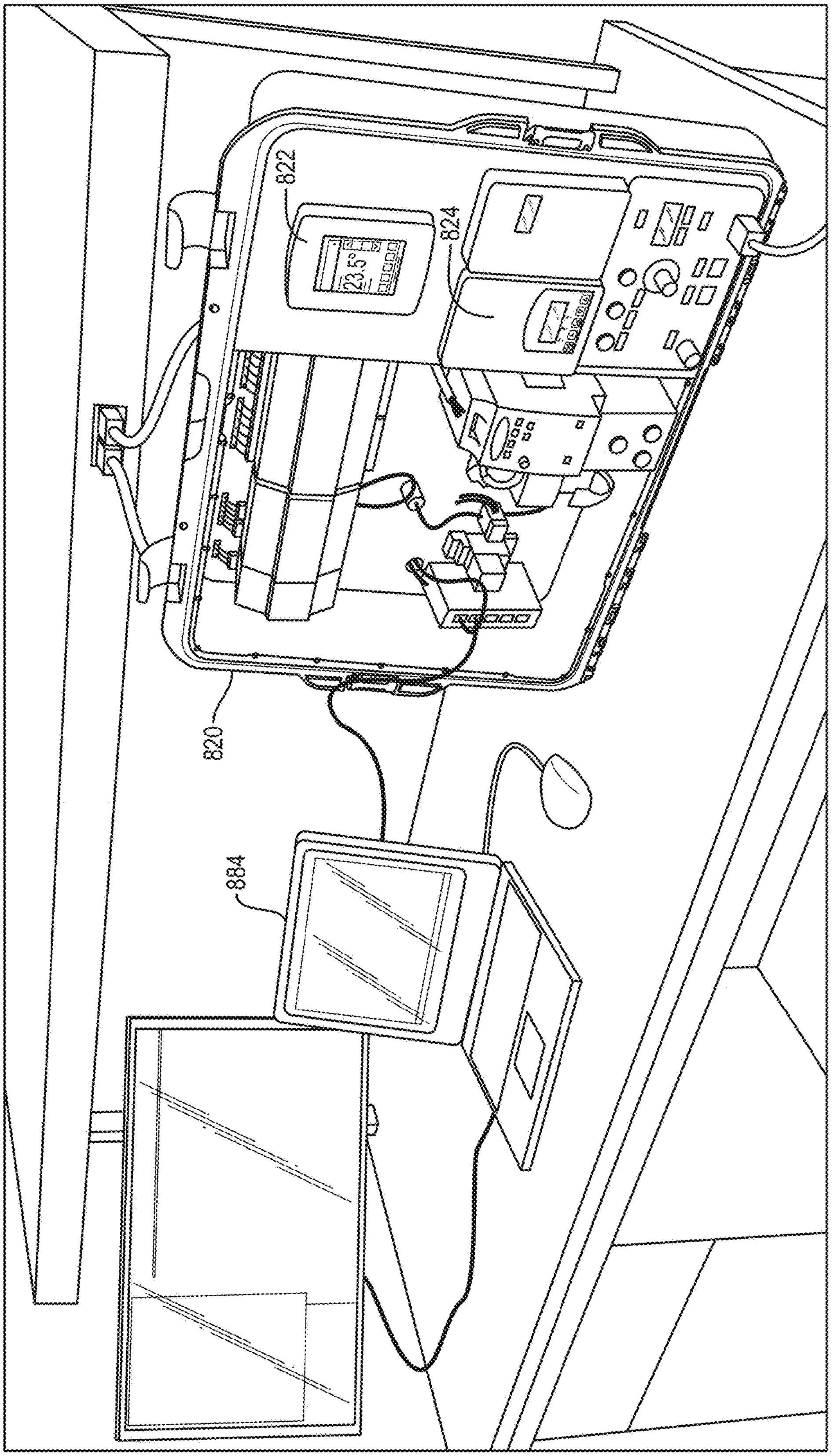
FIGS. 8A-8D are images of training a user via an emulated real-world building environment according to an example embodiment.
Figure 8B:
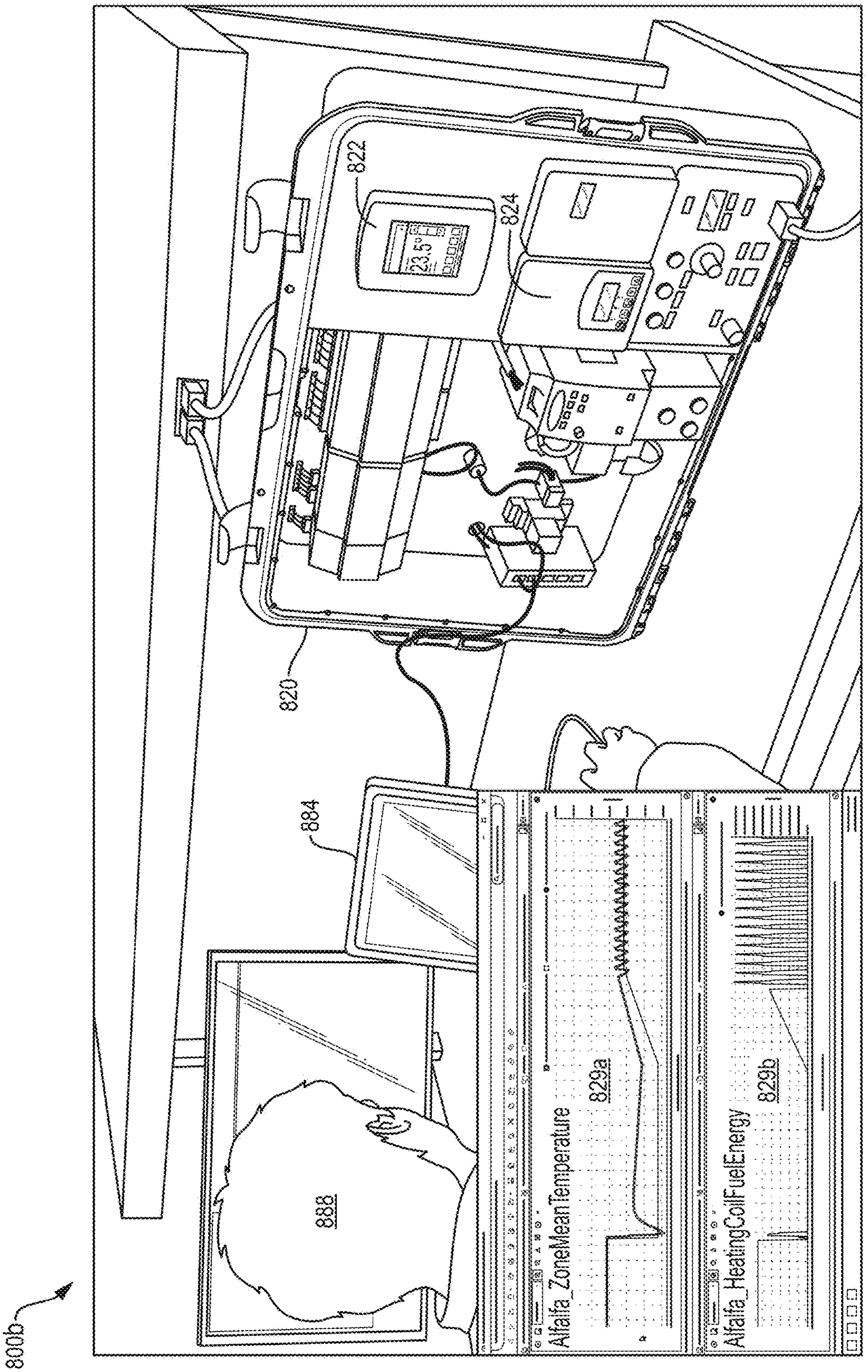
Figure 8C:
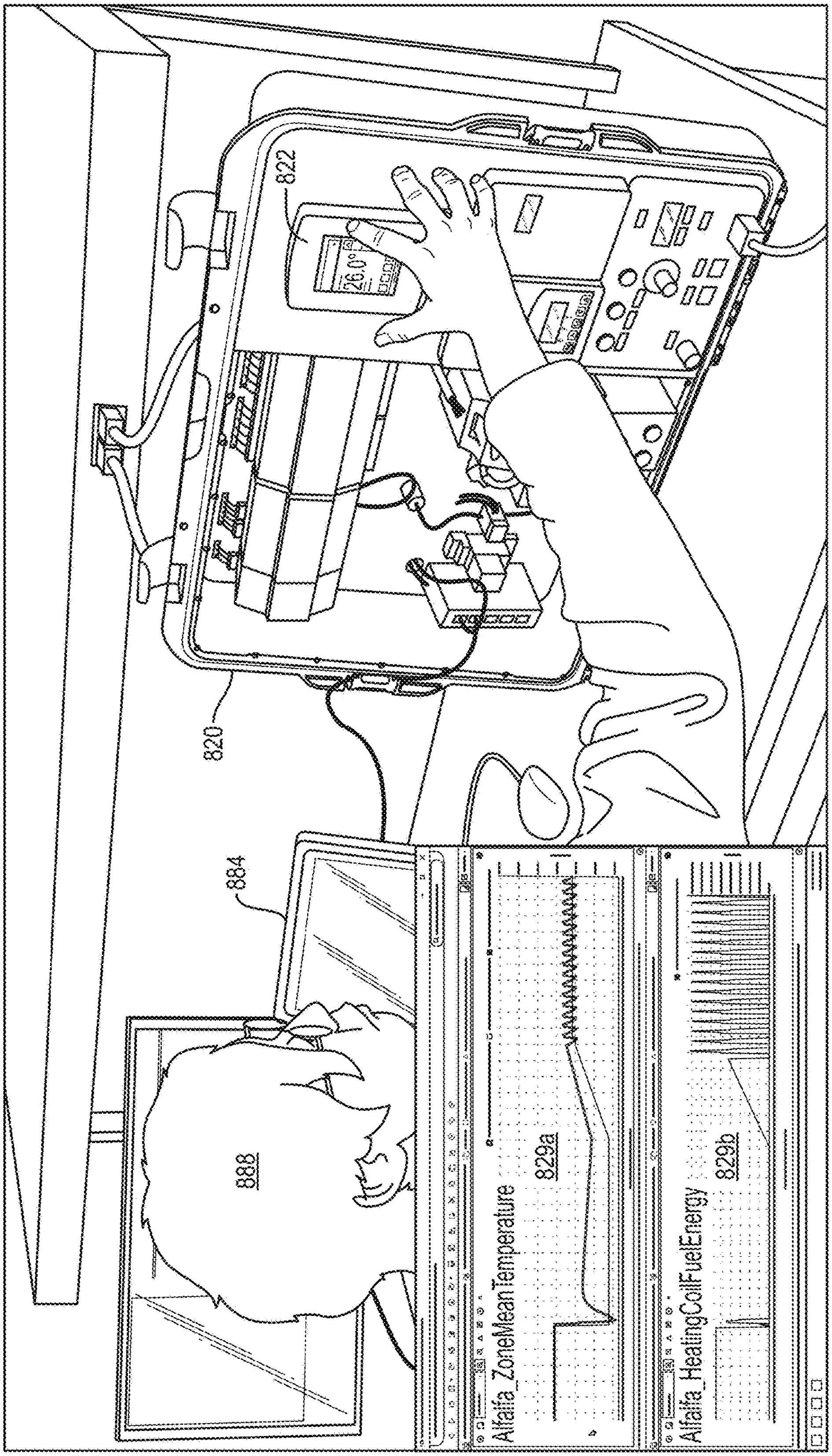
Figure 8D:
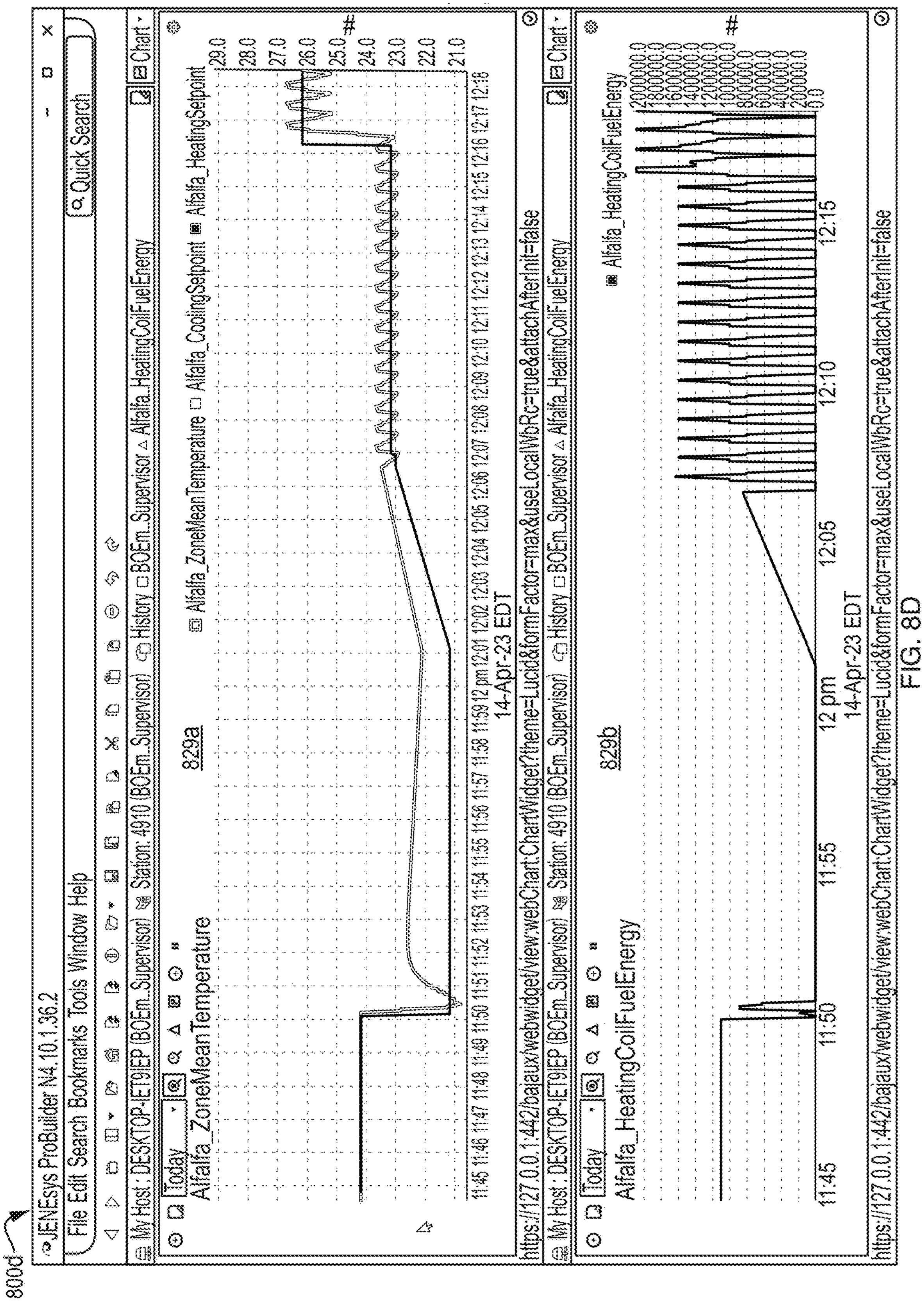

FIGS. 8A-8D are images 800*a*-800*d* of training a user via an emulated real-world building environment according to an example embodiment. As shown in FIG. 8A, a building training interface 820 and a user device 884 may be provided. The interface 820 may include a RTU controller 822 and a thermostat 824. The user device 884 may be configured to execute a computer-based system, e.g., the system 110 (FIG. 1) or 210 (FIG. 2). In an example embodiment, the computer-based system may provide a hands-on learning tool with real-world hardware and/or software found in a building such as a commercial building, e.g., the emulated real-world building environment 140 (FIG. 1). According to another example embodiment, as shown in FIGS. 8B and 8C, a student/trainee user 888 can adjust setting(s) of the controller 822, the thermostat 824, and/or system operation(s) (not shown). Further, in yet another example embodiment, as shown in FIG. 8D, the student/trainee 888 can use history charts 829*a* and 829*b* to see real-time effects on, e.g., occupant comfort and energy consumption, respectively, in a simulated environment, e.g., the emulated real-world building environment 140. Embodiments offer a practical way to learn building management systems.

Figure 9:
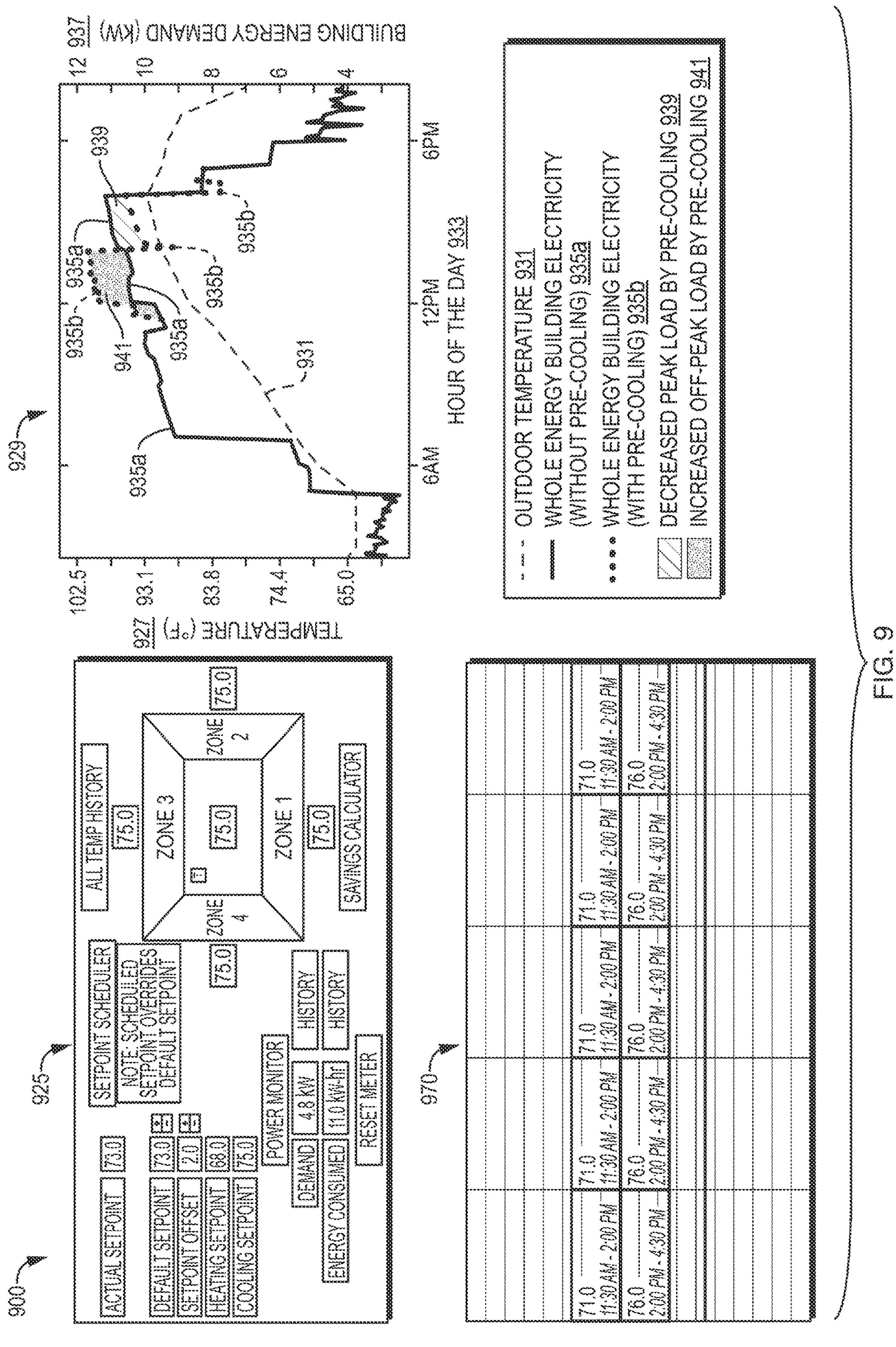
FIG. 9 is a block diagram of an example embodiment of a curriculum.

FIG. 9 is a block diagram of an example embodiment of a curriculum 900. In the example embodiment of FIG. 9, a goal of the curriculum 900 may be to shift peak electricity demand outside of peak demand billing hours, for non-limiting example. In the example embodiment of FIG. 9, the curriculum 900 may include a temperature/energy overview 925, a setpoint schedule editor 970, and a history chart 929. The chart 929 may illustrate temperature 927, e.g., degrees Fahrenheit (° F.), as a function of time 933, e.g., hour of the day for non-limiting example, for outdoor temperature 931, as well as energy demand 937, e.g., building energy demand in kilowatts (KW), as a function of the time 933 for whole energy building electricity without pre-cooling 935*a* and with precooling 935*b*. In addition, the chart 929 may illustrate regions of decreased peak load by precooling 939 and increased off-peak load by precooling 941.

Figure 10:
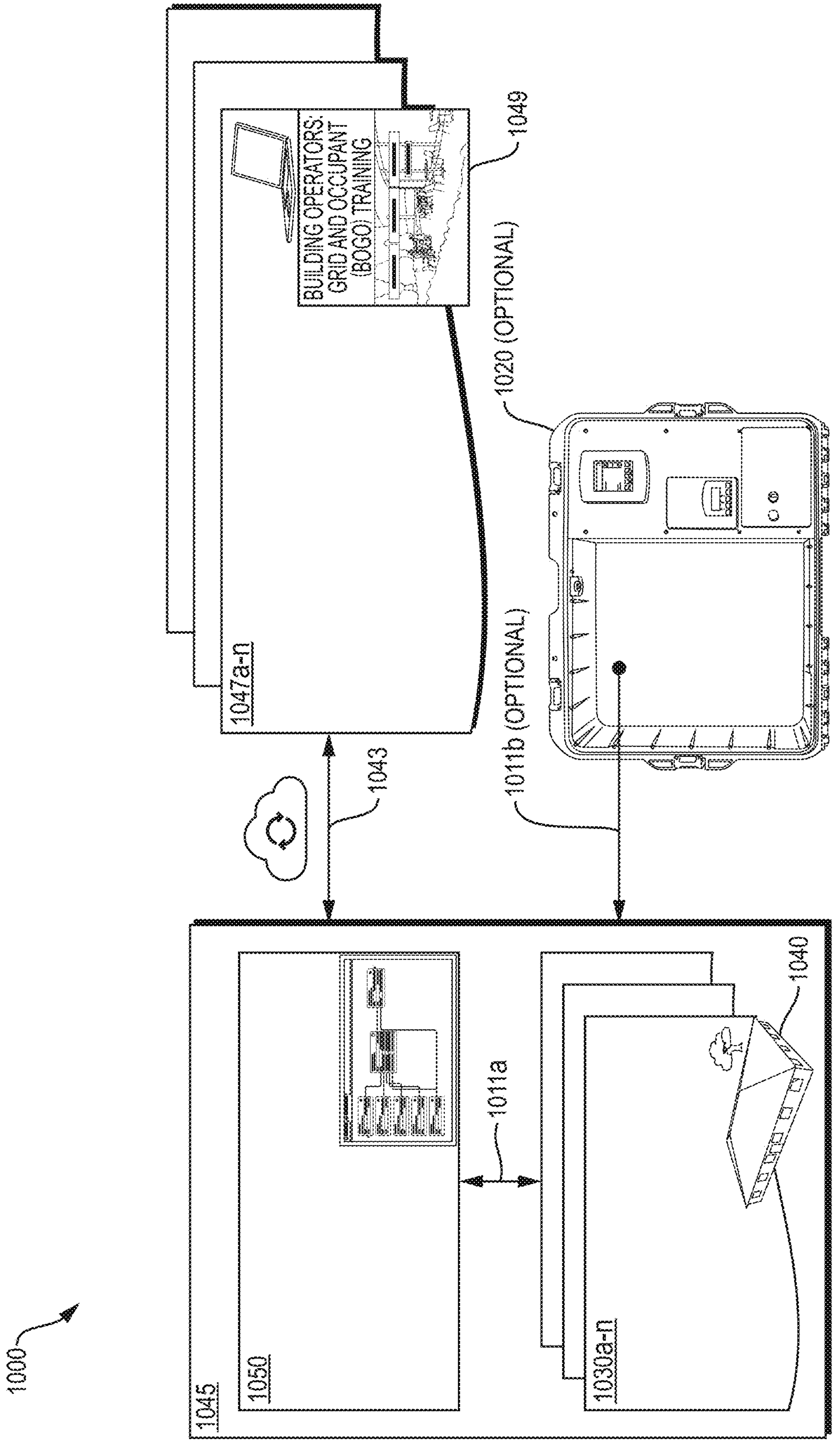
FIG. 10 is a block diagram of another example embodiment of an architecture for training a user via an emulated real-world building environment.

FIG. 10 is a block diagram of another example embodiment of an architecture 1000 for training a user via an emulated real-world building environment. In the example embodiment of FIG. 10, the architecture 1000 includes a cloud server 1045, a supervisor module 1050, building simulation model(s) 1030*a*-1030*n* (which may utilize, e.g., EnergyPlus® or other suitable known tools), user device(s) 1047*a*-1047*n*, an emulated real-world building environment 1040, and a homepage 1049. According to another example embodiment, the emulated real-world building environment 1040 may be a 5,500 square foot building including five zones with a rooftop HP and gas, subject to Denver, CO weather, and running 24/7. Further, in yet another example embodiment, the architecture 1000 may also optionally include a building training interface 1020.

According to an example embodiment, the cloud server 1045 may execute a computer-based system, e.g., the system 110 (FIG. 1) or 210 (FIG. 2). In another example embodiment, the computer-based system may be configured to, based on an initial training input (not shown) from a trainer user (not shown), implement the building simulation model(s) 1030*a*-1030*n*. The building simulation model(s) 1030*a*-1030*n* may be configured to produce the emulated real-world building environment 1040. The computer-based system may be further configured to, for an iteration of the building simulation model(s) 1030*a*-1030*n*, determine a value of at least one forcing function (not shown). The at least one forcing function may be associated with the emulated real-world building environment 1040.

In an example embodiment, at least one building operation input (not shown) may be entered by the trainer user and/or trainee user(s) or user group(s) (not shown) via corresponding building training interface(s) (not shown)

executing on the user device(s) 1047*a*-1047*n*. For instance, the trainer user may use the corresponding building training interface of the user device 1047*a* to interact with the building simulation model 1030*a* as a baseline, while the trainee user(s)/user group(s) may use the remaining corresponding building training interface(s) of the user device(s) 1047*b*-1047*n* to interact with the remaining building simulation model(s) 1030*b*-1030*n*. According to another example embodiment, the trainer user and/or trainee user(s)/user group(s) may use the user device(s) 1047*a*-1047*n* and/or the corresponding building training interface(s) to, e.g., login to the homepage 1049 via a web browser with separate username(s)/password(s), step through a curriculum (such as the curriculum 900 of FIG. 9), view current temperature(s)/temperature trend(s)/setpoints/power demand/costs, and adjust setpoint schedules. Further, in yet another example embodiment, the at least one building operation input may be transmitted to the supervisor 1050 (executing on the cloud server 1045) via network 1043, which may be, e.g., the Internet or other suitable known network.

According to an example embodiment, the supervisor 1050 may be, e.g., a component provided as part of the Niagara Framework® or other suitable known framework. In another example embodiment, the supervisor 1050 may provide functionality for the computer-based system and/or the building simulation model(s) 1030*a*-1030*n* including, e.g., running "24/7" (i.e., continuously), determining sequence(s) of operations, analyzing/determining energy costs, simulating occupant(s), and establishing alarms and schedules. Further, in yet another example embodiment, the supervisor 1050 may periodically, e.g., in one-minute update intervals, transmit data and/or information to the computer-based system and/or the building simulation model(s) 1030*a*-1030*n* including, e.g., temperature(s), setpoint(s), and submeter energy usage; the transmitting may occur via network 1011*a*, which may be, e.g., a network employing BACnet® or other suitable known communication protocol such as a protocol used for BAC networks.

Continuing with reference to FIG. 10, in an example embodiment, the computer-based system may be further configured to, based on (i) the value of the at least one forcing function determined and (ii) the at least one building operation input, transform a current state (not shown) of the building simulation model(s) 1030*a*-1030*n* into an updated state (not shown) of the building simulation model(s) 1030*a*-1030*n*. According to another example embodiment, the computer-based system may be further configured to, based on (i) the updated state and (ii) the initial training input, generate at least one building training item (not shown) for the trainer user and/or trainee user(s)/user group(s). Further, in yet another example embodiment, the at least one building training item may be provided to the corresponding building training interface(s) of the user device(s) 1047*a*-1047*n* by the supervisor 1050 via the network 1043.

Continuing with reference to FIG. 10, the optional building training interface 1020 may be, e.g., an iConnect® Training PT-181 BAS portable training unit; other suitable known building training interfaces may also be used. According to an example embodiment, the optional building training interface 1020 may serve as a hands-on component to an immersive training simulator such as the computer-based system. In another example embodiment, the optional building training interface 1020 may include thermostat control(s) (not shown) to simulate a temperature of the emulated real-world building environment 1040. Further, in yet another example embodiment, the optional building training interface 1020 may allow a trainee user (not shown) to watch a variable air volume (VAV) system (not shown) and fan controller (not shown) activate when needed by the emulated real-world building environment 1040. According to an example embodiment, at least one building operation input (not shown) may be imported from the optional building training interface 1020 via optional network 1011*b*, which may be, e.g., a network employing BACnet® or other suitable known communication protocol such as a protocol used for BAC networks.

Figure 11:
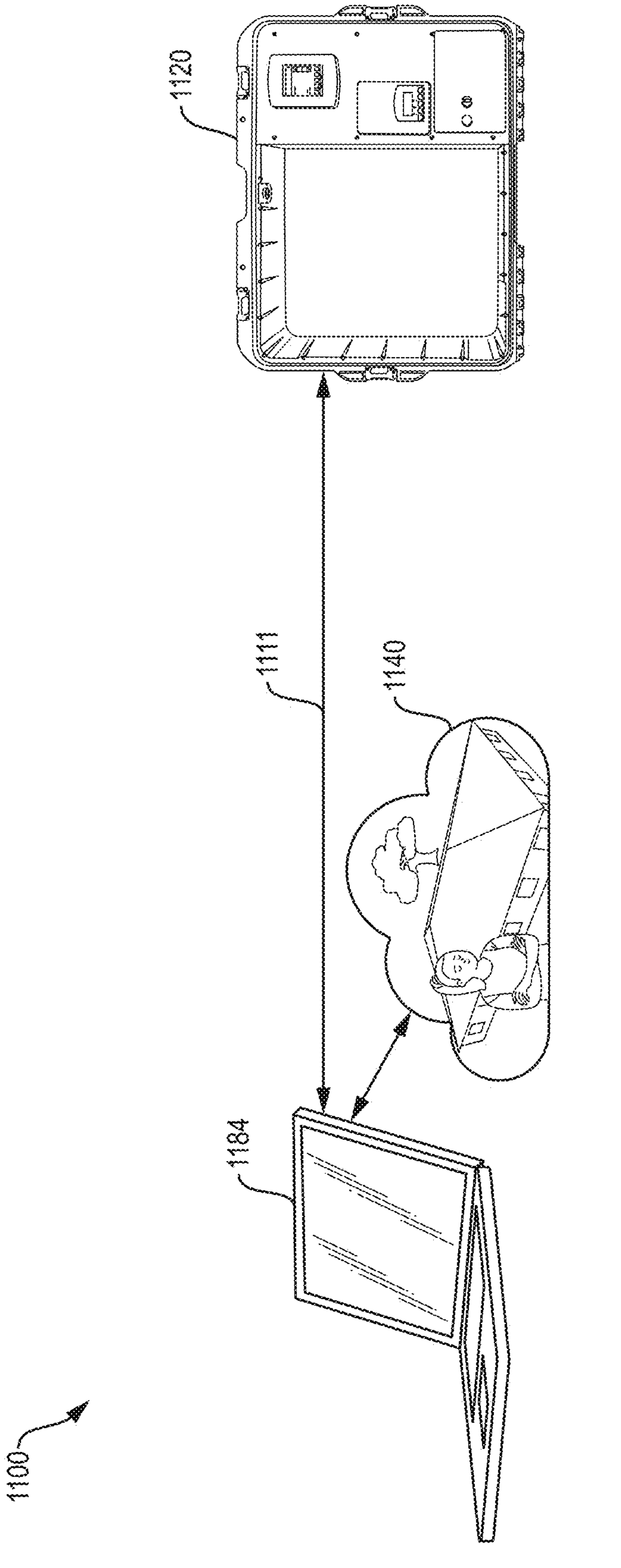
FIG. 11 is a block diagram of yet another example embodiment of an architecture for training a user via an emulated real-world building environment.

FIG. 11 is a block diagram of yet another example embodiment of an architecture 1100 for training a user via an emulated real-world building environment. In the example embodiment of FIG. 11, the architecture 1100 may include a user device 1184 and a building training interface 1120, the latter of which may be, e.g., a Direct Digital Controls (DDC) training unit. According to an example embodiment, the user device 1184 may be configured to execute a computer-based system, e.g., 110 (FIG. 1) or 210 (FIG. 2). The building training interface 1120 may correspond to a trainee user, e.g., 188 (FIG. 1) or 888 (FIG. 8B). The computer-based system may be configured to, based on an initial training input, e.g., 178 (FIG. 1), from a trainer user, e.g., 182 (FIG. 1), implement a building simulation model, e.g., 130 (FIG. 1), 230 (FIG. 2), or 1030*a*-1030*n* (FIG. 10). The trainer user may employ or alternatively may be the user device 1184 such as a PC, laptop, table, smartphone, or any other suitable known user device. The building simulation model may be configured to produce an emulated real-world building environment 1140. The computer-based system may be further configured to, for an iteration of the building simulation model, determine a value of at least one forcing function (not shown). The at least one forcing function may be associated with the emulated real-world building environment 1140. The computer-based system may be further configured to, based on (i) the value of the at least one forcing function determined and (ii) at least one building operation input, e.g., 186 (FIG. 1), 286 (FIG. 2), 386 (FIG. 3A), 486 (FIG. 4A), or 586 (FIG. 5), received from the trainee user via the building training interface 1120, transform a current state (not shown) of the building simulation model into an updated state (not shown) of the building simulation model. The computer-based system may be further configured to, based on (i) the updated state and (ii) the initial training input, generate at least one building training item, e.g., 192 (FIG. 1) or 292 (FIG. 2), for the trainee user.

Continuing with reference to FIG. 11, in an example embodiment, the computer-based system may have a target workforce (not shown) of, e.g., building operators and building commissioners, and may impart workforce skills (not shown) including, e.g., adjusting a BAS schedule to reduce peak power, understand BAS operating limits and tradeoffs, identifying causes of occupant thermal discomfort and temperature variations, and identifying faults and interpreting BAS alarms. According to another example embodiment, the building training interface 1120 may have a target workforce (not shown) of, e.g., DDC/BAS programmers and technicians, and may impart workforce skills (not shown) including, e.g., identifying key components of building automation, wiring BAS to HVAC (heating, ventilation, and air conditioning) system components, configuring BAS component hardware and software, and implementing and troubleshooting DDC programs.

Figure 12:
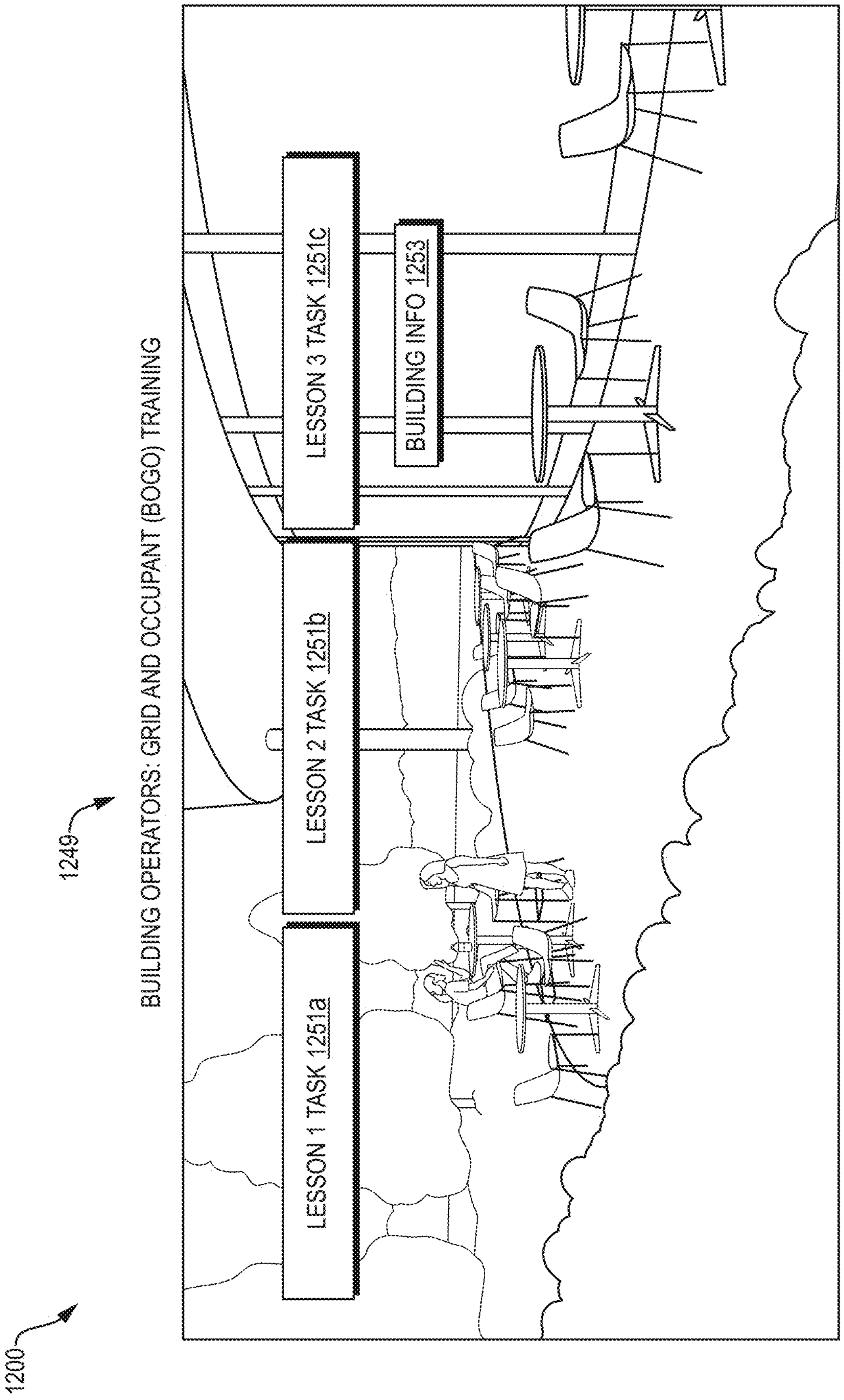
FIG. 12 is a block diagram of an example embodiment of a user interface including a homepage.

FIG. 12 is a block diagram of an example embodiment of a user interface 1200 including a homepage 1249. In the example embodiment of FIG. 12, the homepage 1249 may be presented when a student, e.g., the trainee user 188 (FIG.

1) or 888 (FIG. 8B), is logged in to a computer-based system, e.g., the system 110 (FIG. 1) or 210 (FIG. 2), with student-specific credentials. According to an example embodiment, an instructor, e.g., the trainer user 182 (FIG. 1), may also be presented with the homepage 1249 when clicking on a student from an admin homepage (not shown). In another example embodiment, the homepage 1249 may include lesson task buttons 1251*a*-1251*c* and building information button 1253. Further, in yet another example embodiment, one student may not have access to other students' homepages.

Figure 13:
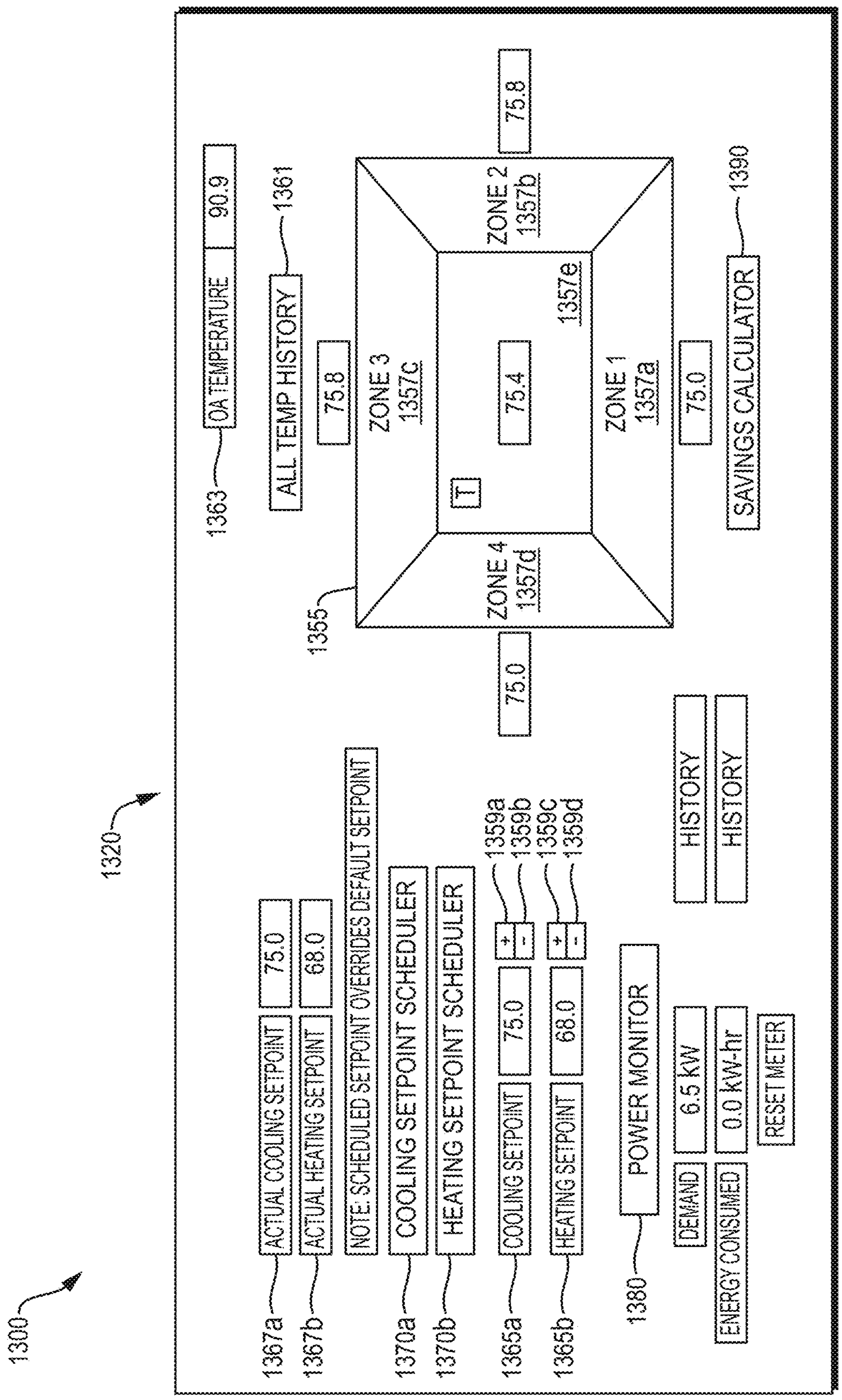
FIG. 13 is a block diagram of an example embodiment of a lesson task interface including a building training interface.

FIG. 13 is a block diagram of an example embodiment of a lesson task interface 1300 including a building training interface 1320. In the example embodiment of FIG. 13, the building training interface 1320 may display a floor plan 1355 of a space (not shown) in a building, e.g., the emulated real-world building environment 140 (FIG. 1), with five different exemplary thermal zones: South 1357*a*, East 1357*b*, North 1357*c*, West 1357*d*, and interior 1357*e*. The building training interface 1320 may also display a value for outside air (OA) temperature 1363 as well as values for actual setpoints 1367*a*-1367*b*. The building training interface 1320 may include power monitor 1380 and savings calculator 1490, as well as button 1361 for visualizing historical temperatures of the floor plan 1355.

Continuing with reference to FIG. 13, according to an example embodiment, because a purpose of the lesson task interface 1300 may be to simulate a precooling strategy during the hottest week of a year, a student, e.g., the trainee user 188 (FIG. 1) or 888 (FIG. 8B), can change or modify default setpoints 1365*a* and 1365*b* (such as by using + (plus)/− (minus) buttons 1359*a*-1359*b* and 1359*c*-1359*d*, respectively) and/or schedule a setpoint change via setpoint schedulers 1370*a*-1370*b*.

Figure 14:
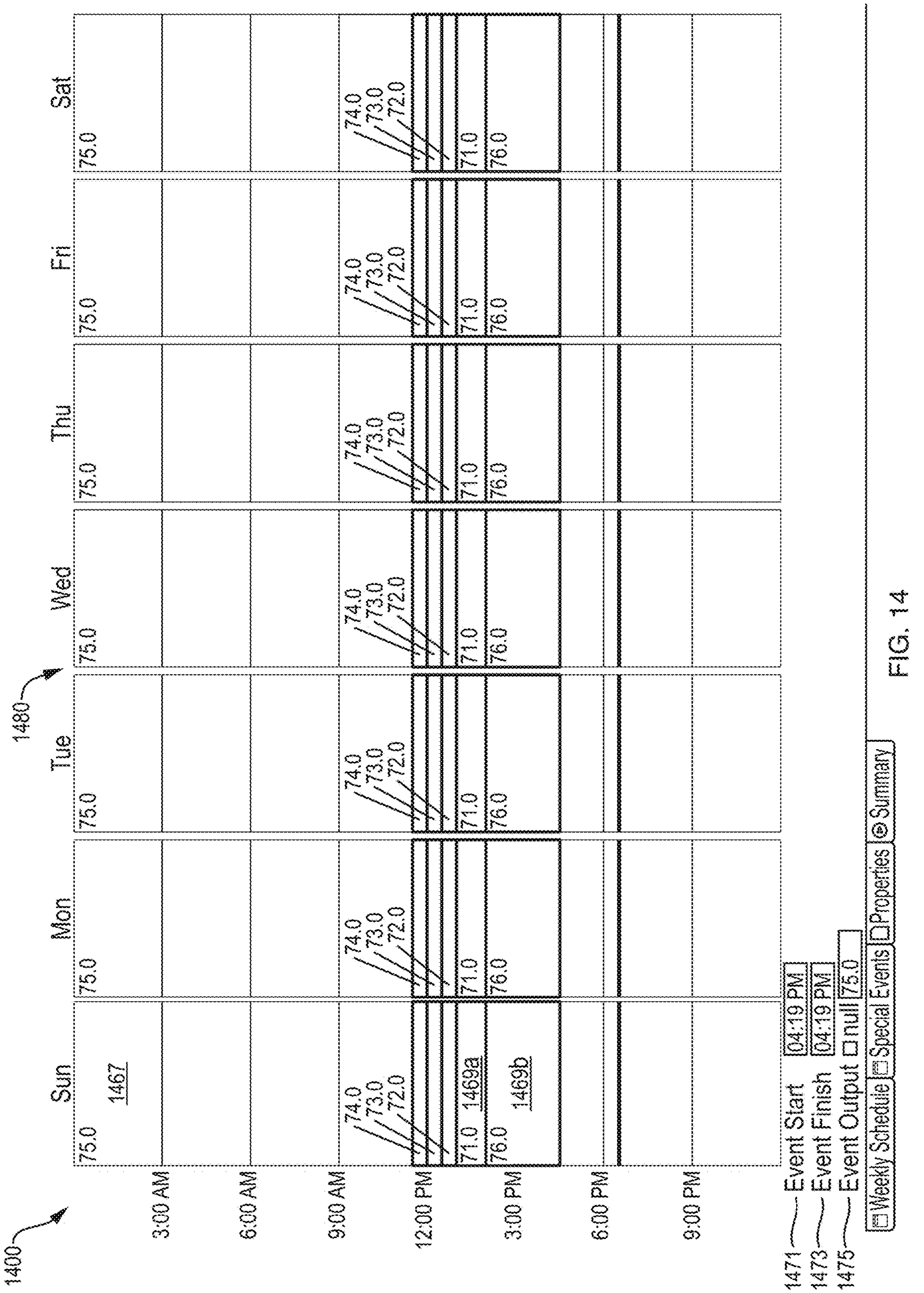
FIG. 14 is a block diagram of an example embodiment of a user interface including a setpoint scheduler.

FIG. 14 is a block diagram of an example embodiment of a user interface 1400 including a setpoint scheduler 1480. In the example embodiment of FIG. 14, the setpoint scheduler 1480 may be used by a student, e.g., the trainee user 188 (FIG. 1) or 888 (FIG. 8B), to program, e.g., a precooling strategy by modifying both a value and a duration of a setpoint (not shown). For instance, according to an example embodiment, the setpoint scheduler 1480 may be employed in an attempt to shift peak consumption by "overcooling" a space (not shown) in a building, e.g., the emulated real-world building environment 140 (FIG. 1), 1040 (FIG. 10), or 1140 (FIG. 11), to a first temperature 1469*a* of 71° F., then allowing the space to reach a second temperature 1469*b* of 76° F. during warmest hours of a day, and eventually going back to a default temperature 1467 of 75° F. In another example embodiment, the setpoint scheduler 1480 may be used to create a new event by inputting values for the event start 1471, event finish 1473, and event output 1475.

Figure 15:
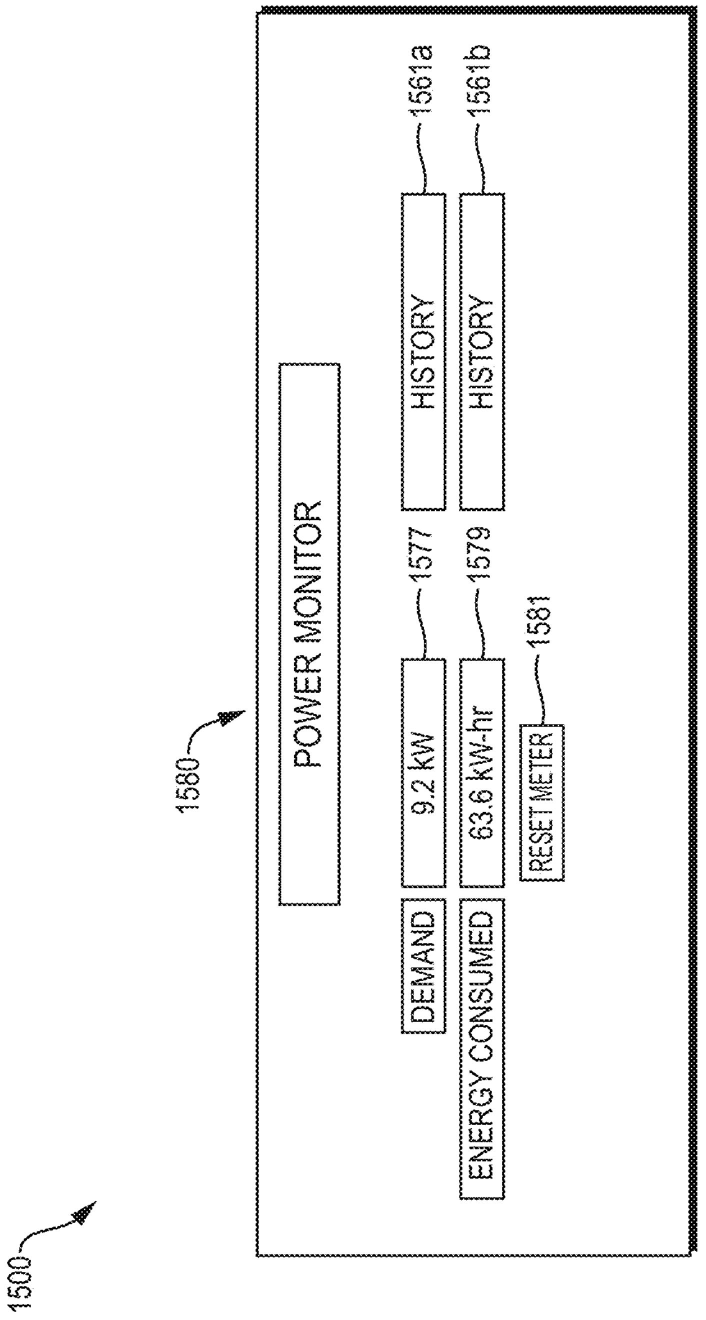
FIG. 15 is a block diagram of an example embodiment of a user interface including a power monitor.

FIG. 15 is a block diagram of an example embodiment of a user interface 1500 including a power monitor 1580. In the example embodiment of FIG. 15, at a bottom left area of the interface 1500, the power monitor 1580 may show an energy demand 1577 of a building, e.g., the emulated real-world building environment 140 (FIG. 1), 1040 (FIG. 10), or 1140 (FIG. 11), in, e.g., kW, as well as energy consumption 1579 in, e.g., kilowatt-hours (kW-hr), from a last meter reset. According to another example embodiment, because a student, e.g., the trainee user 188 (FIG. 1) or 888 (FIG. 8B), may need to figure out the energy consumption 1579 for a week (or month) of simulation, e.g., the building simulation model 130 (FIG. 1), 230 (FIG. 2), or 1030*a*-1030*n* (FIG. 10), meter reset button 1581 may facilitate starting from zero at a beginning of a task, and then writing down the energy consumed 1579 at an end of the task. Further, in yet another example embodiment, clicking on history button 1561*a* or 1561*b* may cause display of a history chart, e.g., the chart 1629 of FIG. 16 (described in more detail hereinbelow), for the energy demand 1577 or the energy consumption 1579, respectively.

Figure 16:
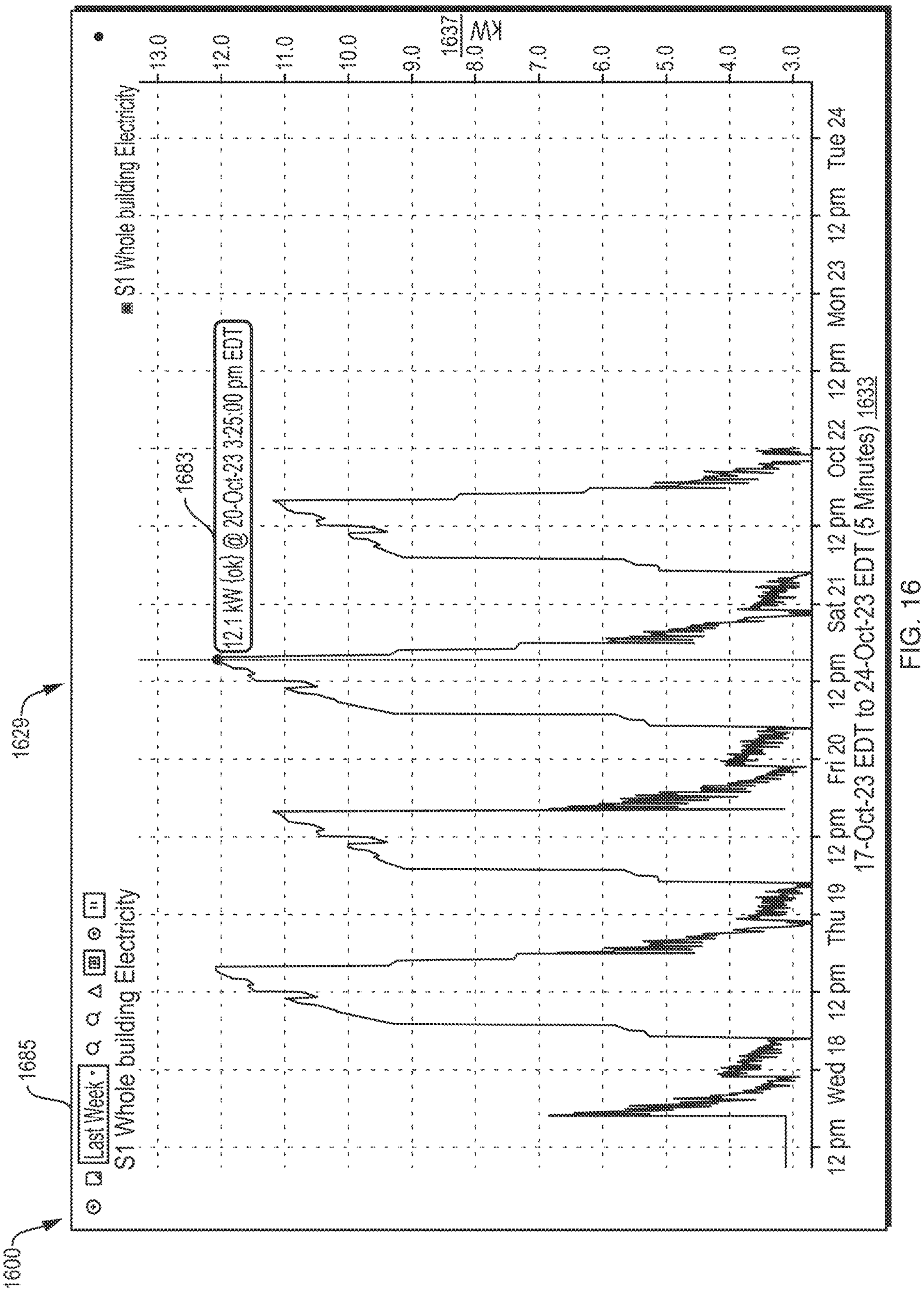
FIG. 16 is a block diagram of an example embodiment of a user interface including a history chart.

FIG. 16 is a block diagram of an example embodiment of a user interface 1600 including a history chart 1629. In the example embodiment of FIG. 16, the chart 1629 may illustrate energy demand 1637, e.g., whole building electricity demand in kW for non-limiting example, as a function of time 1633. According to an example embodiment, a student, e.g., the trainee user 188 (FIG. 1) or 888 (FIG. 8B), can figure out peak demand by clicking on a history button, e.g., the history button 1561*a* (FIG. 15), next to a demand value, e.g., the demand value 1577 (FIG. 15). In another example embodiment, the chart 1629 can be easily adjusted for, e.g., a week or month, of data using dropdown list 1685 on a top left corner of the user interface 1600. Further, in yet another example embodiment, by hovering with a mouse over a highest spike of the chart 1629, a student can determine peak demand 1683 and use it on a savings calculator, e.g., calculator 1790 of FIG. 17 (described in more detail hereinbelow).

Figure 17:
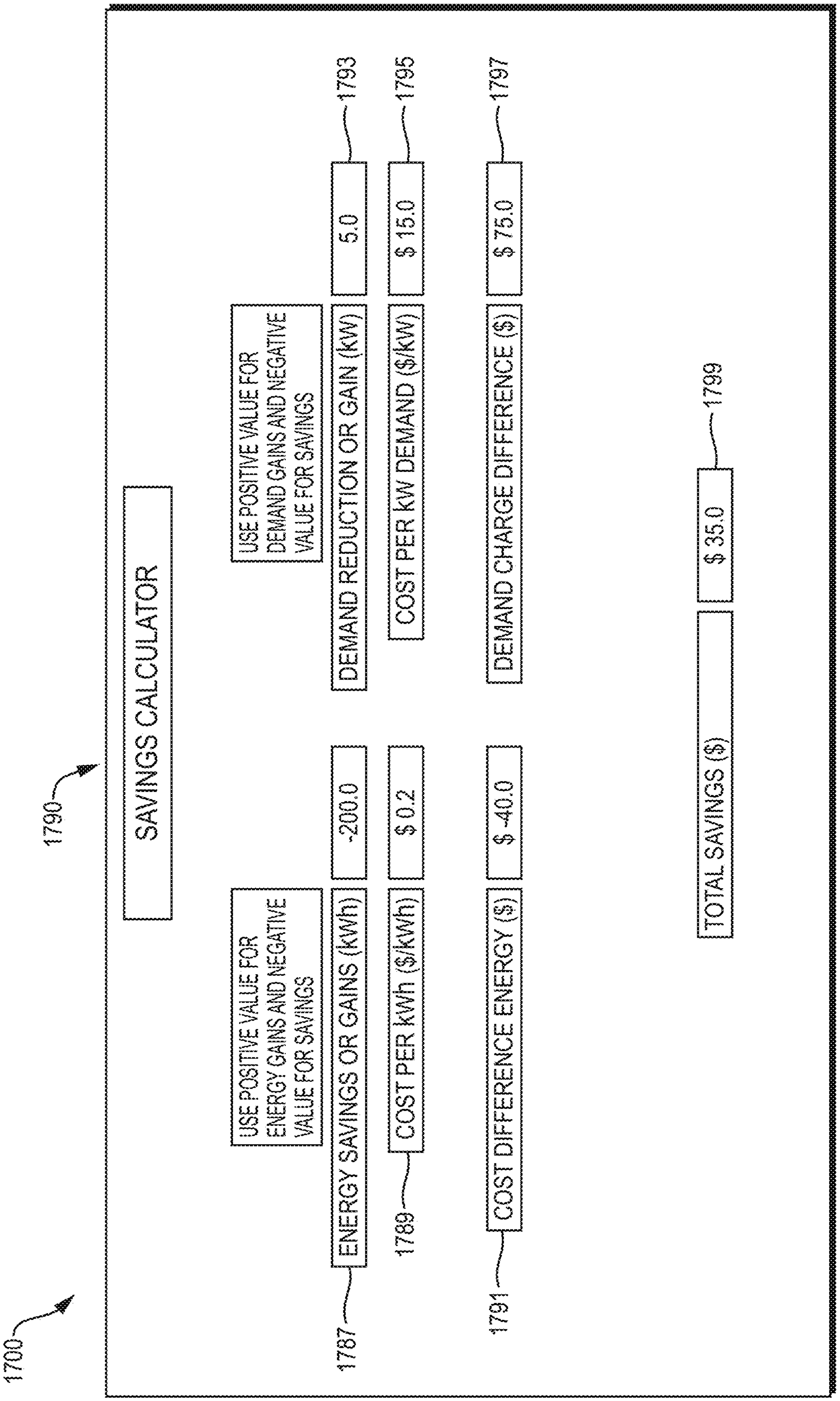
FIG. 17 is a block diagram of an example embodiment of a user interface including a savings calculator.

FIG. 17 is a block diagram of an example embodiment of a user interface 1700 including a savings calculator 1790. In the example embodiment of FIG. 17, a student, e.g., the trainee user 188 (FIG. 1) or 888 (FIG. 8B), may receive from an instructor, e.g., the trainer user 182 (FIG. 1), values (not shown) for total energy consumption and peak demand of a building, e.g., the emulated real-world building environment 140 (FIG. 1), 1040 (FIG. 10), or 1140 (FIG. 11), running "business as usual." According to another example embodiment, once a student has figured out differences in total energy consumption 1787 and peak demand 1793, the savings calculator 1790 (which may be accessible from a building training interface, e.g., the interface 1320 of FIG. 13) may allow the student to easily figure out how much money in, e.g., dollars ($), the building saved (or lost) for energy costs 1791 and demand charges 1797, respectively, as well as total savings (or loss) 1799. Further, in yet another example embodiment, a student can also change energy consumption 1789 and demand 1795 rates if needed.

Figure 18:
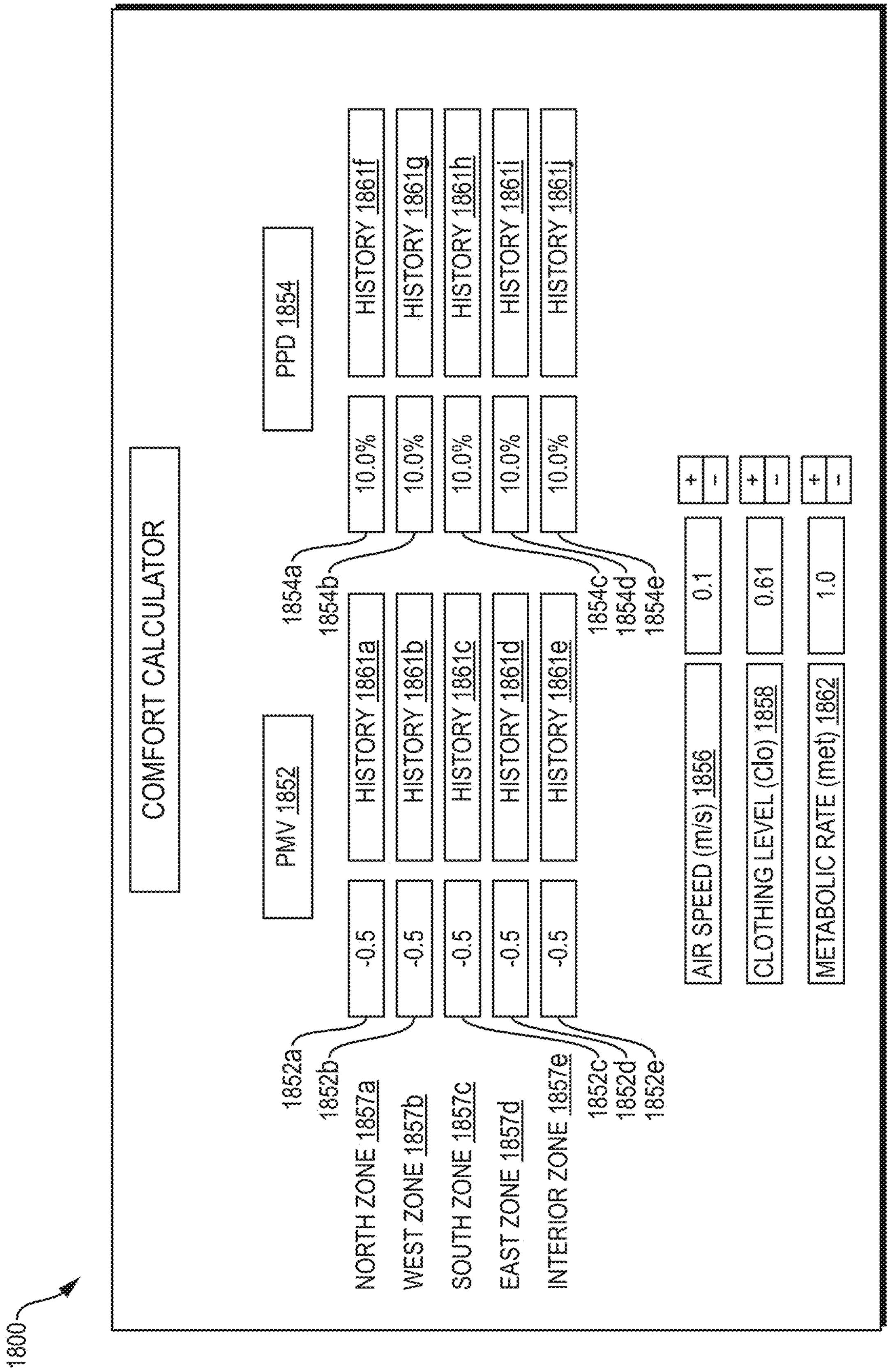
FIG. 18 is a block diagram of an example embodiment of an interface for calculating occupant comfort.

FIG. 18 is a block diagram of an example embodiment of an interface 1800 for calculating occupant comfort. In the example embodiment of FIG. 18, the interface 1800 may display predicted mean vote (PMV) 1852*a*-1852*e* and predicted percentage of dissatisfied (PPD) 1854*a*-1854*e* values corresponding to zones 1857*a*-1857*e* of a space (not shown) in a building, e.g., the emulated real-world building environment 140 (FIG. 1), 1040 (FIG. 10), or 1140 (FIG. 11). According to an example embodiment, PMV may be an index that aims to predict a mean value of votes of a group of occupants on a seven-point thermal sensation scale; PPD may be an index that establishes a quantitative prediction of a percentage of thermally dissatisfied occupants (i.e., too warm or too cold). In another example embodiment, the interface 1800 may include buttons 1861*a*-1861*e* for 1861*f*-1861*j* for visualizing historical PMV 1852*a*-1852*e* or PPD 1854*f*-1854*j* data, respectively, corresponding to the zones 1857*a*-1857*e*. Further, in yet another example embodiment, the interface 1800 may also enable a student, e.g., the trainee user 188 (FIG. 1) or 888 (FIG. 8B), to adjust values for air speed 1856 in, e.g., meters/second (m/s), occupant clothing level 1858, and/or occupant metabolic rate 1862.

Figure 19:
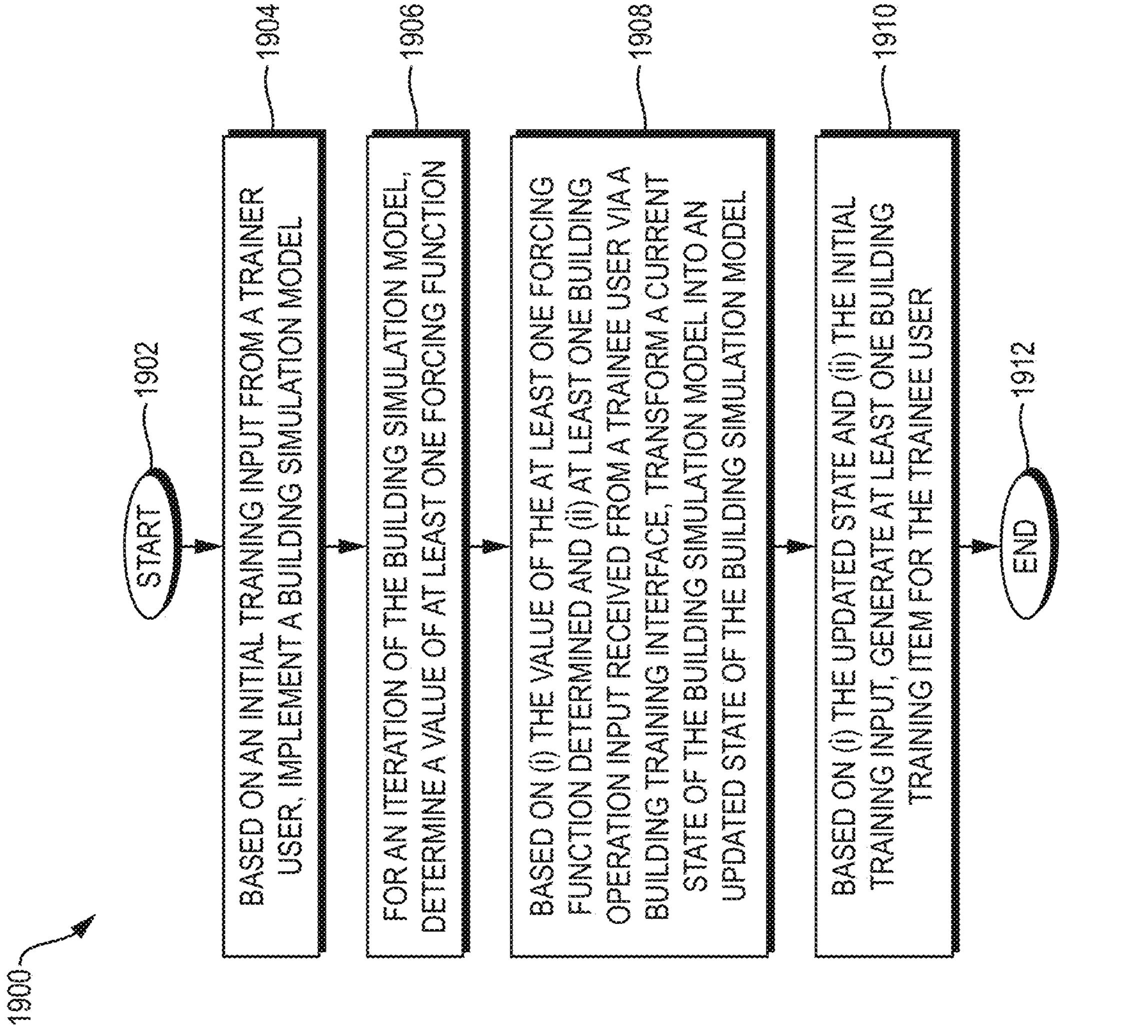
FIG. 19 is a flow diagram of an example embodiment of a computer-implemented method.

FIG. 19 is a flow diagram of an example embodiment of a computer-implemented method 1900 for training a user via an emulated real-world building environment. The method 1900 begins 1902 and comprises, based on an initial training input from a trainer user, implementing (1904) a building simulation model. The building simulation model is configured to produce an emulated real-world building environment. The method 1900 further comprises, for an iteration of the building simulation model, determining (1906) a value of at least one forcing function. The at least one forcing function is associated with the emulated real-world building environment. The method 1900 further comprises, based on (i) the value of the at least one forcing function determined (1906) and (ii) at least one building operation input received from a trainee user via a building training interface, transforming (1908) a current state of the building simulation model into an updated state of the building simulation model. The method 1900 further comprises, based on (i) the updated state and (ii) the initial training input, generating (1910) at least one building training item for the trainee user. The method 1900 thereafter ends 1912 in the example embodiment.

According to an example embodiment, a computer-based system may provide simulation-based learning for building operators, which is not currently utilized in existing building operator curriculums. The system may employ a HwIL approach, where a BAS simulator, e.g., a physical simulator, interacts with a model, e.g., a model leveraging EnergyPlus® or other suitable known tool, in real-time (or faster than real-time). This is a unique approach that enables students to simulate real-life building scenarios. The system may allow for risk-free learning opportunities for building operators without a need for real, physical buildings, reducing a risk of damage or injury associated with traditional training methods. The system may allow for developing and scaling a wide variety of training scenarios with much less effort as compared to existing approaches, because a configuration of a target building can be easily customized by modifying an input of a simulation. The system may co-simulate a standardized model, e.g., a model leveraging EnergyPlus® or other suitable known tool, with a BAS simulator, e.g., a commercial hardware simulator, providing a more realistic simulation environment for students. The system may be provided in the form of a standalone product.

An example embodiment of the system may provide a hands-on and risk-free learning experience for building operators, allowing them to learn through simulation-based training in a controlled environment, which enhances their learning experience and improves their skill set. The system may eliminate a need for costly on-site training and reduce risk of damage or injury associated with traditional training methods, providing a cost-effective training solution for building operators. The system may co-simulate a standardized model, e.g., a model leveraging EnergyPlus® or other suitable known tool, with a BAS simulator, e.g., a commercial hardware simulator, providing a more realistic simulation environment for students, which can result in better decision making and energy management. The system may allow students to modify schedules and setpoints to meet energy management objectives, such as efficiency and peak reduction for non-limiting examples, resulting in improved energy efficiency and cost savings. The system can be developed into a standalone product, providing a scalable solution for building operator training, which can result in wider adoption of simulation-based training in the building industry.

An example embodiment of the system can be used as an educational tool to train building operators on how to operate and manage building systems effectively in a controlled and realistic simulation environment. The system can be utilized as a continuing education tool for building operators to improve their skills and stay up to date with the latest building automation technologies. The system can be used as a tool for building managers and engineers to optimize energy management strategies in real-time and evaluate impact of different energy-saving measures. The system can be used as a research tool for developing and testing new building automation technologies and strategies. The system can be used as a testing tool for certification programs, instilling building operators with skills and knowledge to operate and manage building systems effectively.

An example embodiment of the system may provide a unique tool to assess performance of building systems and recommend energy-saving strategies, resulting in improved decision-making and energy management. The tool can be utilized by, e.g., building operators or consulting firms that offer building automation and energy management services to their clients.

Example embodiments disclosed herein may provide a more cost-effective and scalable solution for building operator training and energy management optimization, resulting in improved energy efficiency, cost savings, and reduced risk of damage or injury. Example embodiments disclosed herein may provide a more realistic, hands-on, and risk-free learning experience for building operators, resulting in improved energy management, better decision-making, and a more skilled workforce in the building industry.

Figure 20:
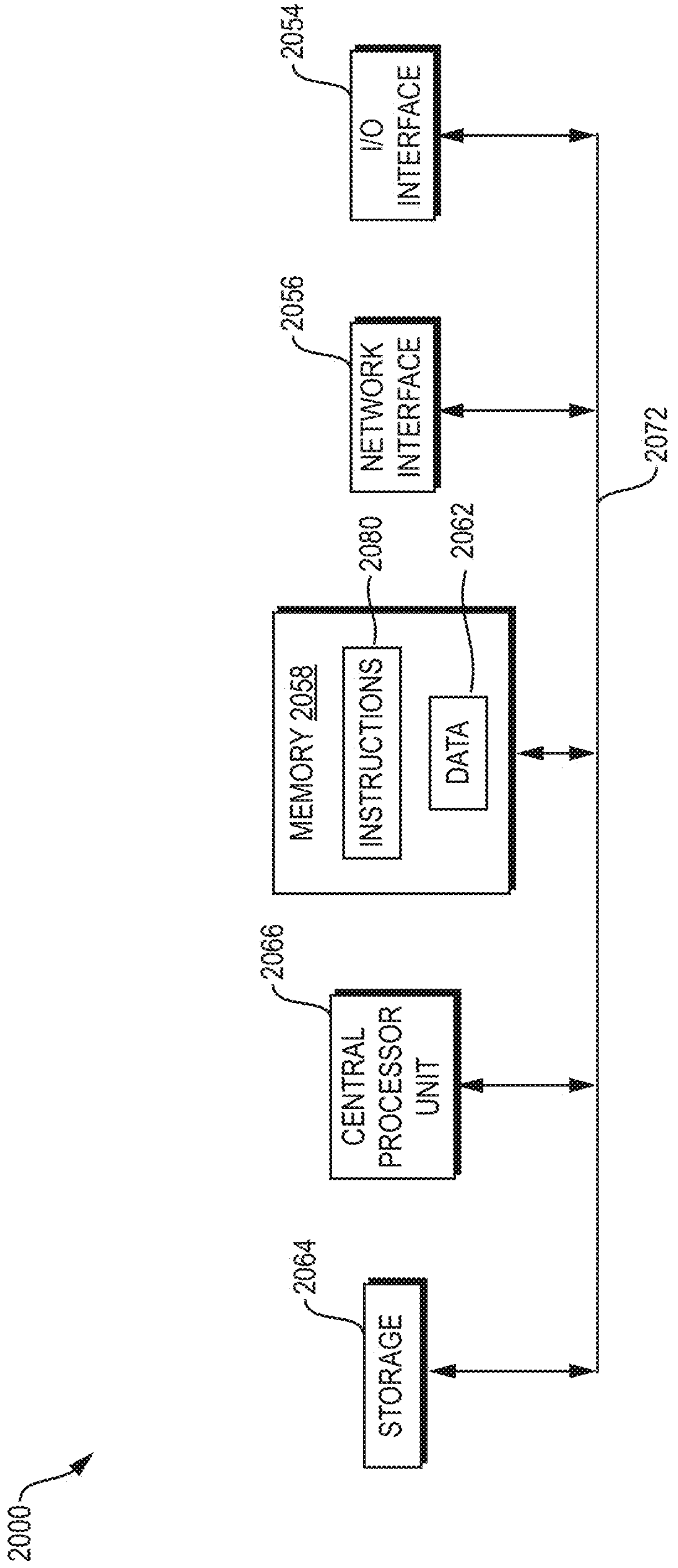
FIG. 20 is a block diagram of an example embodiment of an internal structure of a computer optionally within an embodiment disclosed herein.

FIG. 20 is a block diagram of an example embodiment of an internal structure of a computer 2000 in which various embodiments of the present disclosure may be implemented. The computer 2000 contains a system bus 2072, where a bus is a set of hardware lines used for data transfer among the components of a computer or digital processing system. The system bus 2072 is essentially a shared conduit that connects different elements of a computer system (e.g., processor, disk storage, memory, I/O ports, network ports, etc.) that enables the transfer of information between the elements. Coupled to the system bus 2072 is an I/O device interface 2054 for connecting various input and output devices (e.g., keyboard, mouse, displays, printers, speakers, etc.) to the computer 2000. A network interface 2056 allows the computer 2000 to connect to various other devices attached to a network (e.g., global computer network, wide area network, local area network, etc.). A memory 2058 provides volatile or non-volatile storage for computer software instructions 2080 and data 2062 that may be used to implement embodiments (e.g., the computer-based system 110, the computer-based system 210, and the method 1900, etc.) of the present disclosure, where the volatile and non-volatile memories are examples of non-transitory media. A disk storage 2064 provides non-volatile storage for the computer software instructions 2080 and data 2062 that may be used to implement embodiments (e.g., the computer-based system 110, the computer-based system 210, and the method 1900, etc.) of the present disclosure. A central processor unit 2066 is also coupled to the system bus 2072 and provides for the execution of computer instructions.

As used herein, the terms "model," "module," "interface," and "framework" may refer to any hardware, software, firmware, electronic control component, processing logic, and/or processor device, individually or in any combination, including without limitation: an application specific integrated circuit (ASIC), a field-programmable gate array (FPGA), an electronic circuit, a processor and memory that executes one or more software or firmware programs, and/or other suitable components that provide the described functionality.

Example embodiments disclosed herein may be configured using a computer program product; for example, controls may be programmed in software for implementing example embodiments. Further example embodiments may include a non-transitory computer-readable medium that contains instructions that may be executed by a processor, and, when loaded and executed, cause the processor to complete methods (e.g., the method 1900, etc.) described herein. It should be understood that elements of the block and flow diagrams may be implemented in software or hardware, such as via one or more arrangements of circuitry of FIG. 20, disclosed above, or equivalents thereof, firmware, a combination thereof, or other similar implementation determined in the future.

In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as random-access memory (RAM), read-only memory (ROM), compact disk read-only memory (CD-ROM), and so forth. In operation, a general purpose or application-specific processor or processing core loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments disclosed herein.

The teachings of all patents, published applications, and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A computer-based system for training a user via an emulated real-world building environment, the computer-based system comprising:

a building training interface corresponding to a trainee user;

at least one processor; and a memory with computer code instructions stored thereon, the at least one processor and the memory, with the computer code instructions, configured to cause the computer-based system to:

based on an initial training input from a trainer user, implement a building simulation model, the building simulation model configured to produce an emulated real-world building environment;

for an iteration of the building simulation model, determine a value of at least one forcing function, the at least one forcing function associated with the emulated real-world building environment;

generate at least one simulation control signal based on at least one building operation input received from the trainee user via the building training interface;

based on (i) the value of the at least one forcing function determined and (ii) the at least one simulation control signal generated, transform a current state of the building simulation model into an updated state of the building simulation model; and based on (i) the updated state and (ii) the initial training input, generate at least one building training item for the trainee user.

2. The computer-based system of claim 1, wherein the building training interface is a first building training interface, the building simulation model is a first building simulation model, and the trainee user is a first trainee user, and further comprising a second building training interface corresponding to a second trainee user, and wherein the at least one processor and the memory, with the computer code instructions, are further configured to cause the computer-based system to:

based on the initial training input from the trainer user, implement a second building simulation model, the second building simulation model configured to produce the emulated real-world building environment;

for the iteration, generate at least one second simulation control signal based on at least one building operation input received from the second trainee user via the second building training interface and based on (i) the value of the at least one forcing function determined and (ii) the at least one second simulation control signal generated, transform a current state of the second building simulation model into an updated state of the second building simulation model; and based on (i) the updated state of the first building simulation model, (ii) the updated state of the second building simulation model, and (iii) the initial training input, generate the at least one building training item for the first trainee user, the at least one building training item including a comparison of building operation performance of the first trainee user and building operation performance of the second trainee user.

3. The computer-based system of claim 1, wherein the at least one processor and the memory, with the computer code instructions, are further configured to cause the computer-based system to:

iteratively determine the value of the at least one forcing function and transform the current state of the building simulation model into the updated state of the building simulation model on an ongoing basis while the trainee user is interacting with the building training interface, during times when the trainee user is not interacting with the building training interface, or based on input from the trainer user.

4. The computer-based system of claim 3, wherein the at least one processor and the memory, with the computer code instructions, are further configured to cause the computer-based system to:

iteratively determine the value of the at least one forcing function and transform the current state of the building simulation model into the updated state of the building simulation model in real-time or faster-than-real-time.

5. The computer-based system of claim 3, wherein the at least one processor and the memory, with the computer code instructions, are further configured to cause the computer-based system to:

iteratively determine the value of the at least one forcing function and transform the current state of the building simulation model into the updated state of the building simulation model in at least one of: a periodic mode, an event driven mode, and a mode defined by the trainer user.

6. The computer-based system of claim 1, wherein a forcing function of the at least one forcing function relates to at least one of: (i) weather conditions, (ii) electricity costs, (iii) energy costs, and (iv) occupant behavior.

7. The computer-based system of claim 1, wherein the at least one processor and the memory, with the computer code instructions, are further configured to cause the computer-based system to:

based on subsequent training input from the trainer user, configure at least one parameter of (i) the building simulation model or (ii) a forcing function of the at least one forcing function.

8. The computer-based system of claim 7, wherein the subsequent training input represents at least one of a simulated malfunction of the real-world building environment and a simulated weather event for the real-world building environment.

9. The computer-based system of claim 1, wherein the initial training input includes at least one criterion for a building operation certification, and wherein the at least one processor and the memory, with the computer code instructions, are further configured to cause the computer-based system to:

perform a determination of whether the updated state of the building simulation model satisfies the at least one criterion; and responsive to the determination performed indicating that the updated state of the building simulation model satisfies the at least one criterion, generate the at least one building training item, the at least one building training item including an indication that the trainee user has achieved the building operation certification.

10. The computer-based system of claim 9, wherein a criterion of the at least one criterion relates to an energy optimization objective or an occupant satisfaction objective.

11. The computer-based system of claim 1, wherein the at least one processor and the memory, with the computer code instructions, are further configured to cause the computer-based system to:

generate a visual comparison of (i) one or more states of the building simulation model and (ii) one or more states of a baseline model; and wherein a building training item of the at least one building training item generated includes the visual comparison generated.

12. The computer-based system of claim 11, wherein the one or more states of the baseline model represent (i) states of the emulated real-world building environment simulated by the trainer user or (ii) historical states of the real-world building environment.

13. The computer-based system of claim 1, wherein the trainee user includes a trainee group of multiple users, each of the multiple users having a corresponding role in the trainee group, and wherein the at least one processor and the memory, with the computer code instructions, are further configured to cause the computer-based system to:

generate multiple simulation control signals based on multiple respective building operation inputs received from the multiple users via the building training interface;

based on (i) the value of the at least one forcing function determined and (ii) the multiple simulation control signals generated, transform the current state of the building simulation model into the updated state of the building simulation model; and based on (i) the updated state and (ii) the initial training input, generate the at least one building training item, the at least one building training item including an evaluation of relative building operation performance of the multiple users.

14. The computer-based system of claim 1, wherein the building training interface includes a hardware-based interface or a cloud-based interface.

15. The computer-based system of claim 14, wherein the hardware-based interface is a building automation system (BAS) training interface.

16. A computer-implemented method for training a user via an emulated real-world building environment, the computer-implemented method comprising:

based on an initial training input from a trainer user, implementing a building simulation model, the building simulation model configured to produce an emulated real-world building environment;

for an iteration of the building simulation model, determining a value of at least one forcing function, the at least one forcing function associated with the emulated real-world building environment;

generating at least one simulation control signal based on at least one building operation input received from a trainee user via a building training interface;

based on (i) the value of the at least one forcing function determined and (ii) the at least one simulation control signal generated, transforming a current state of the building simulation model into an updated state of the building simulation model; and based on (i) the updated state and (ii) the initial training input, generating at least one building training item for the trainee user.

17. The computer-implemented method of claim 16, further comprising:

iteratively determining the value of the at least one forcing function and transforming the current state of the building simulation model into the updated state of the building simulation model in at least one of: a periodic mode, an event driven mode, and a mode defined by the trainer user.

18. The computer-implemented method of claim 16, further comprising:

based on subsequent training input from the trainer user, configuring at least one parameter of (i) the building simulation model or (ii) a forcing function of the at least one forcing function.

19. The computer-implemented method of claim 18, wherein the subsequent training input represents at least one of a simulated malfunction of the real-world building environment and a simulated weather event for the real-world building environment.

20. A non-transitory computer-readable medium having encoded thereon a sequence of instructions which, when loaded and executed by at least one processor, causes the at least one processor to:

based on an initial training input from a trainer user, implement a building simulation model, the building simulation model configured to produce an emulated real-world building environment;

for an iteration of the building simulation model, determine a value of at least one forcing function, the at least one forcing function associated with the emulated real-world building environment;

generate at least one simulation control signal based on at least one building operation input received from a trainee user via a building training interface;

based on (i) the value of the at least one forcing function determined and (ii) the at least one simulation control signal generated, transform a current state of the building simulation model into an updated state of the building simulation model; and based on (i) the updated state and (ii) the initial training input, generate at least one building training item for the trainee user.

* * * * *